(12) United States Patent
Harris et al.

(10) Patent No.: US 6,732,251 B2
(45) Date of Patent: May 4, 2004

(54) REGISTER FILE CIRCUITRY

(75) Inventors: Jonathan Michael Harris, North Stoke (GB); Adrian Philip Wise, Bracknell (GB); Nigel Peter Topham, Finchampstead (GB)

(73) Assignee: PTS Corporation, San Jose, CA (US)

( * ) Notice: Subject to any disclaimer, the term of this patent is extended or adjusted under 35 U.S.C. 154(b) by 341 days.

(21) Appl. No.: 09/998,802

(22) Filed: Nov. 1, 2001

(65) Prior Publication Data

US 2002/0083293 A1 Jun. 27, 2002

(30) Foreign Application Priority Data

Nov. 2, 2000 (GB) .............................................. 0026829

(51) Int. Cl.[7] .............................................. G06F 13/00
(52) U.S. Cl. ...................... 711/203; 711/202; 711/204; 712/216; 712/217; 712/218
(58) Field of Search ................................ 711/202, 203, 711/204; 712/216, 217, 218

(56) References Cited

U.S. PATENT DOCUMENTS

| | | | |
|---|---|---|---|
| 5,117,493 A | 5/1992 | Jensen | 395/425 |
| 5,367,650 A | 11/1994 | Sharangpani et al. | 395/375 |
| 5,758,112 A * | 5/1998 | Yeager et al. | 712/217 |
| 6,128,728 A * | 10/2000 | Dowling | 712/228 |
| 6,282,638 B1 * | 8/2001 | Dowling | 712/228 |

FOREIGN PATENT DOCUMENTS

| | | |
|---|---|---|
| EP | 514 763 | 11/1992 |
| EP | 518 469 | 12/1992 |
| GP | 2 359 641 | 8/2001 |
| WO | 95/32466 | 11/1995 |

OTHER PUBLICATIONS

Hwang et al.; "New hardware scheme supporting precise exception handling for out–of–order execution"; *Electronics Letters, IEE Stevenage GB*; vol. 30, No. 1; Jan. 6, 1994, pp. 16–17.

* cited by examiner

Primary Examiner—Reba I. Elmore
(74) Attorney, Agent, or Firm—Greer, Burns & Crain, Ltd.

(57) ABSTRACT

A processor or processor core has register file circuitry having a plurality of physical registers and a plurality of tag storing portions corresponding respectively to the physical registers. Each tag storing portion stores a tag representing a logical register ID allocated to the corresponding physical register. A register selection unit receives a logical register ID and selects one of the logical registers whose tag matches the received logical register ID. A tag changing unit changes the stored tags so as to change a mapping between at least one logical register ID and one of the physical registers. Such register circuitry permits a mapping between logical register IDs and physical registers to be changed quickly efficiently and can permit a desired physical register to be selected quickly.

37 Claims, 16 Drawing Sheets

REGISTER FILE CIRCUITRY

BACKGROUND OF THE INVENTION

1. Field of the Invention

The present invention relates to register file circuitry for use, for example, in a processor or processor core. The present invention also relates to a register renaming method for use, for example, in pipelined loops in such a processor or processor core.

2. Description of the Related Art

In high performance computing, the requirement for cyclic register renaming arises in the context of software-pipelined loops, where a high rate of instruction execution is usually required of the target machine (e.g. microprocessor). Execution time is often dominated by loop structures within the application program. To permit a high rate of instruction execution a processor may include a plurality of individual execution units, with each individual unit being capable of executing one or more instructions in parallel with the execution of instructions by the other execution units.

Such a plurality of execution units can be used to provide a so-called software pipeline made up of a plurality of individual stages. Each software pipeline stage has no fixed physical correspondence to particular execution units. Rather, when a loop structure in an application program is compiled the machine instructions which make up an individual iteration of the loop are scheduled for execution by the different execution units in accordance with a software pipeline schedule. This schedule is divided up into successive stages and the instructions are scheduled in such a way as to permit a plurality of iterations to be carried out in overlapping manner by the different execution units with a selected loop initiation interval between the initiations of successive iterations. Thus, when a first stage of an iteration i terminates and that iteration enters a second stage, execution of the next iteration i+1 is initiated in a first stage of the iteration i+1. Thus, instructions in the first stage of iteration i+1 are executed in parallel with execution of instructions in the second stage of iteration i.

In such software-pipelined loops there are typically several iterations of a loop in a partial state of completion at each moment. Hence, there may be several live copies of each value computed within the loop. To distinguish between these values, and to identify them relative to the current iteration, requires that the name of each value held in a register must change at well-defined moments during loop execution. These renaming points are known by the compiler, which also determines the register name required within each instruction to access each value depending on the iteration in which it was computed.

The name of a value held in a register is known to the programmer or compiler in terms of the register identifiers within each assembly-code instruction. The purpose of static register renaming is to define a scheme whereby these identifiers are translated at runtime into actual register numbers based on a translation scheme that can be predicted by the programmer or compiler.

For example, if a value X is assigned to register r1 in iteration 1, a typical renaming scheme would make that value available in register r2 in iteration 2 and in register r3 in iteration 3, and so on. It is the responsibility of the compiler or programmer to allocate register identifiers to each value in a way that ensures correct operation of the loop.

In software pipelined loops there are usually loop-variant values, i.e. expressions which must be reevaluated in each different iteration of the loop, that must be communicated between different instructions in the pipeline. To deal with such loop-variant values it is possible to store them in a so-called rotating register file. In this case, each loop-variant value is assigned a logical register number within the rotating register file, and this logical register number does not change from one iteration to the next. Inside the rotating register file each logical register number is mapped to a physical register within the register file and this mapping is rotated each time a new iteration is begun, i.e. each time a pipeline boundary is closed. Accordingly, corresponding instructions in different iterations can all refer to the same logical register number, making the compiled instructions simple, whilst avoiding a value produced by one iteration from being overwritten by a subsequently-executed instruction of a different iteration.

With such a register renaming scheme in operation, before an instruction can be executed by the processor it is first necessary, for each register access within a software-pipelined loop, to perform a register mapping process to translate the register identifiers into actual register numbers. This mapping is done at run time and hence places extra time demands on the processor in a highly time-critical activity. It is therefore desirable that the time taken to perform this mapping is as small as possible.

Our co-pending United Kingdom patent application number 0004582.3 describes mapping circuitry capable of carrying out this mapping. That mapping circuitry receives as an input value a logical register number and produces an output value, within a preselected range of allowable values, representing an actual physical register number. The circuitry produces two candidate output values in parallel, the first candidate output value differing by a first offset value from the received input value, and the second candidate output value differing by a second offset value from the received input value. For any input value within a preselected range of allowable input values, one of the first and second candidate output values is within the preselected output-value range and the other of those two values is outside that range. The circuitry determines which one of the first and second candidate output values is within that preselected output-value range and selects that candidate output value as the final output value. The determination of the in-range candidate output value is also carried out in parallel with the production of the first and second candidate output values themselves. Although this mapping circuitry operates desirably fast in most practical applications, it is desirable to provide register file circuitry in which the mapping can be carried out even more quickly.

BRIEF SUMMARY OF THE INVENTION

Register file circuitry according to the invention comprises a plurality of physical registers, and a plurality of tag storing portions corresponding respectively to the physical registers. Each tag storing portion stores a tag representing a logical register ID allocated to the corresponding physical register. A register selection unit receives a logical register ID and selects that one of the physical registers whose tag matches the received logical register ID.

In one aspect of the invention, a tag changing unit changes the stored tags by transferring the tag stored in at least one tag storing portion into another one of the tag storing portions. In this way a mapping between at least one logical register ID and one of the physical registers can be changed.

In another aspect of the invention the tag changing unit changes the stored tags so as to change a mapping between at least one logical register ID and one of the physical registers, and the circuitry has a physical register designating unit capable of designating at least one physical register of the plurality as a statically-named physical register whose tag is not changeable by the tag changing unit.

In another aspect of the present invention the register file circuitry comprises a plurality of tag management units corresponding respectively to the physical registers. Each tag management unit includes a tag storing portion for storing a tag representing a logical register ID allocated to the unit's corresponding physical register. Each tag management unit can change the tag stored in the tag storing portion of its own unit. Two or more of the tag management units are operable in parallel with one another to bring about a change in mapping between at least one logical register ID and one of the physical registers.

In still another aspect of the present invention there is provided register file circuitry for use in a processor having a series of pipeline stages for executing instructions. This register file circuitry comprises a first plurality of tag storing portions, corresponding respectively to the physical registers and provided at a first one of the pipeline stages of the series. Each of these tag storing portions stores a working tag representing a logical register ID allocated to the corresponding physical register. The circuitry also comprises a second plurality of tag storing portions, corresponding respectively to the physical registers, for storing respective committed tags corresponding respectively to the working tags. A committed tag updating unit is connected to the second plurality of tag storing portions and updates the committed tags as instructions progress through the pipeline stages. A working tag reloading unit is connected to the first and second pluralities of tag storing portions. When a last valid instruction prior to occurrence of an exception has reached a last one of the pipeline stages, the working tag reloading unit reloads each working tag with its corresponding committed tag.

Register file circuitry as set out above can be provided in a processor.

Another aspect of the present invention can provide a register renaming method for use in register file circuitry having a plurality of physical registers. The method comprises storing tags in a plurality of tag storing portions corresponding respectively to the physical registers. Each stored tag represents a logical register ID allocated to the corresponding physical register. The stored tags are changed by transferring the tag stored in at least one tag storing portion into another one of said tag storing portions so as to change a mapping between at least one logical register ID and one of the physical registers.

DETAILED DESCRIPTION OF THE PREFERRED EMBODIMENTS

Figure 1:
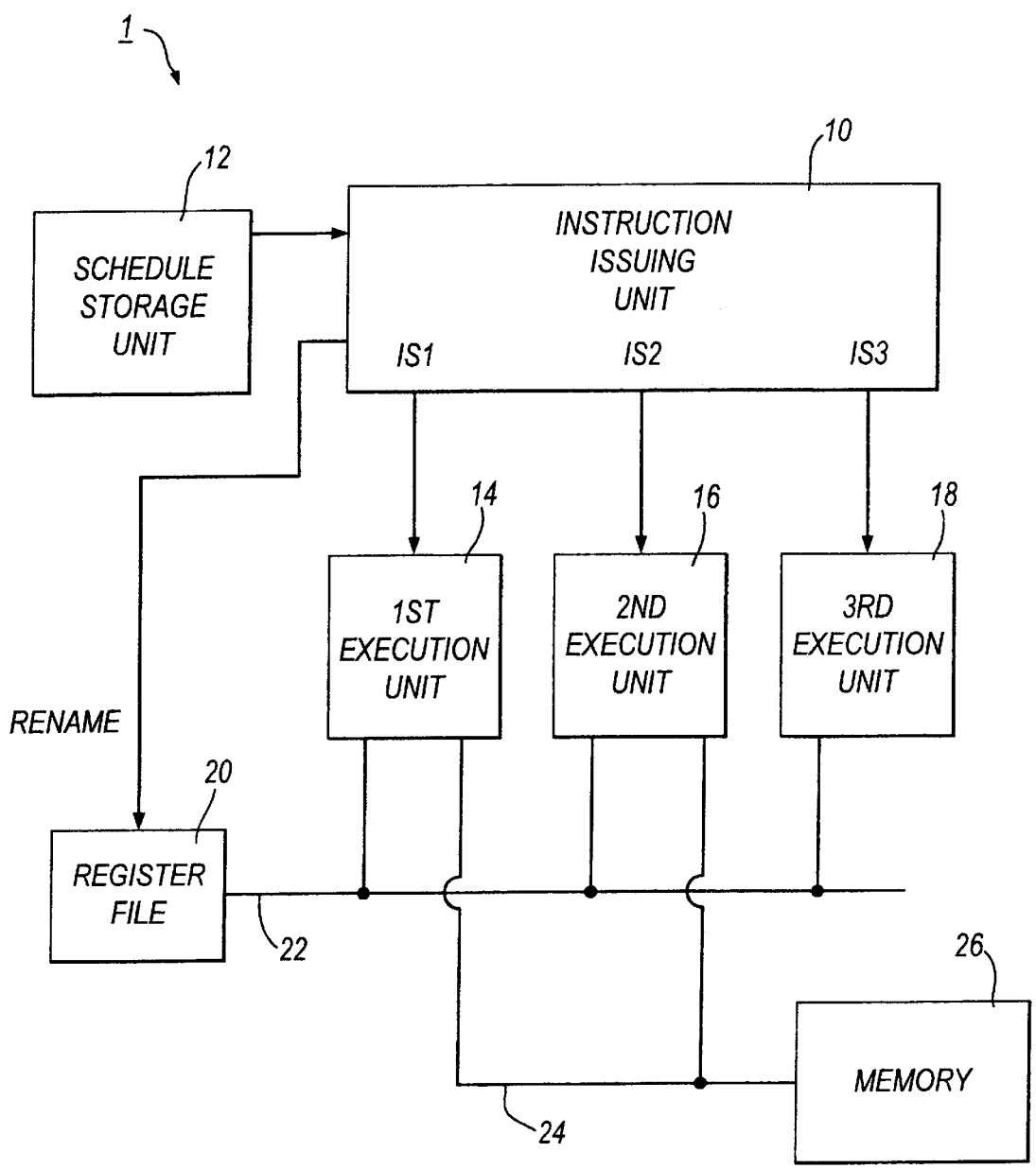
FIG. 1 shows parts of a processor having register file circuitry embodying the present invention.

FIG. 1 shows parts of a processor comprising register file circuitry embodying the present invention. In this example, the processor is a very long instruction word (VLIW) processor with hardware support for software pipelining and cyclic register renaming. The processor 1 includes an instruction issuing unit 10, a schedule storage unit 12, respective first, second and third execution units 14, 16 and 18, and register file circuitry 20. The instruction issuing unit 10 has three issues slots IS1, IS2 and IS3 connected respectively to the first, second and third execution units 14, 16 and 18. A first bus 22 connects all three execution units 14, 16 and 18 to the register file circuitry 20. A second bus 24 connects the first and second units 14 and 16 (but not the third execution unit 18 in this example) to a memory 26 which, in this example, is a RAM internal to the processor 1 such as a cache memory. The memory 26 could alternatively be an external random access memory (RAM) device.

Incidentally, although FIG. 1 shows shared buses 22 and 24 connecting the execution units to the register file circuitry 20 and memory 26, it will be appreciated that alternatively each execution unit could have its own independent connection to the register file circuitry and memory. Also, each execution unit 14, 16 and 18 could be provided with its own register file circuitry.

The processor 1 performs a series of processing cycles. In each processing cycle the instruction issuing unit 10 can issue one instruction at each of the issue slots IS1 to IS3. The instructions are issued according to a software pipeline schedule (described below) stored in the schedule storage unit 12.

The instructions issued by the instructing issuing unit 10 at the different issue slots are executed by the corresponding execution units 14, 16 and 18. In this example each of the execution units can execute more than one instruction at the same time, so that execution of a new instruction can be initiated prior to completion of execution of a previous instruction issued to the execution unit concerned.

To execute instructions, each execution unit 14, 16 and 18 has access to the register file circuitry 20 via the first bus 22. Values held in registers contained in the register file circuitry 20 can therefore be read and written by the execution units 14, 16 and 18. Also, the first and second execution units 14 and 16 have access via the second bus 24 to the memory 26 so as to enable values stored in memory locations of the memory 26 to be read and written as well. The third execution unit 18 does not have access to the memory 26 and so can only manipulate values contained in the register file circuitry 20 in this example.

Figure 2:
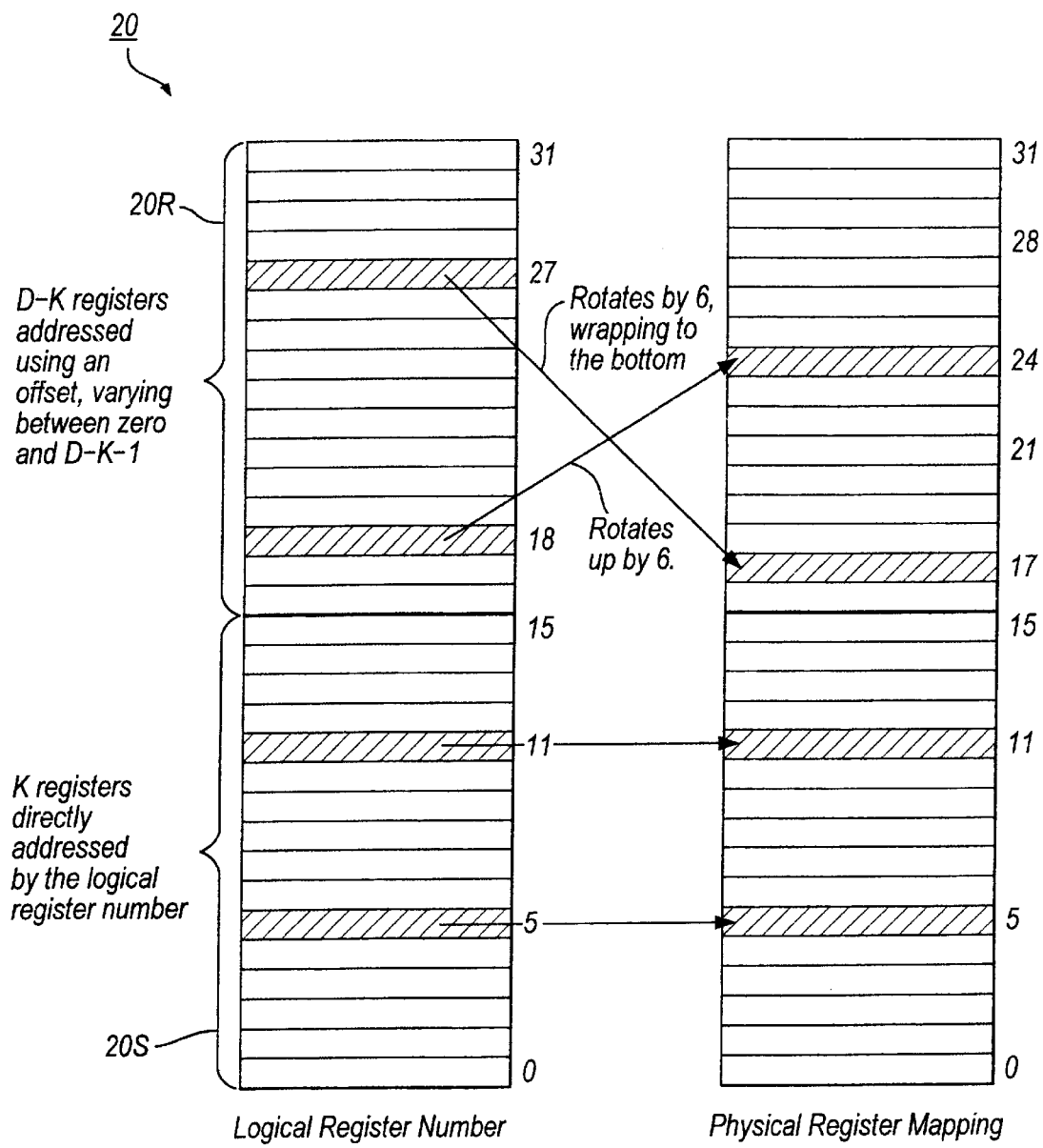
FIG. 2 shows an example register file embodying the present invention.

FIG. 2 shows a schematic view of an example of the register file circuitry 20 in the FIG. 1 processor. The register file circuitry 20 shown in FIG. 2 comprises D physical registers. In this example D=32. Of these D registers, the lower-numbered K registers are statically named and the higher-numbered D–K registers are dynamically named (renameable). In this example, K=16. The statically-named registers make up a statically-named region 20S of the register file and the renameable registers make up a renameable region 20R of the register file.

Each processor instruction requiring access to a physical register in the register file specifies its register operands by means of a logical register number R. This is an m-bit binary integer in the range 0 to D−1, where m=[$\log_2(D)$]. m=5 in this example. Each physical register number P is also an m-bit binary integer in the range 0 to D−1, and identifies directly one of the actual hardware registers (physical registers).

For registers in the statically-named region 20S, i.e. physical registers for which P is in the range 0 to K−1, the mapping from a logical register number R to a physical register number P is given by P=R.

For registers in the dynamically-named portion 20R, i.e. registers for which P is in the range K to D−1, the mapping from a logical register number R to a physical register number P is given by:

$$P = K + |R - K + \text{OFFSET}|_{D-K} \quad (1)$$

In this notation, $|y|_x$ means y modulo x. OFFSET is a variable mapping offset value (integer) which increases (or decreases) whenever the registers in the dynamically-named region 20R are renamed.

OFFSET varies between 0 and D−K−1.

In the present example, with D=32 and K=16, equation 1 above becomes:

$$P = 16 + |R - 16 + \text{OFFSET}|_{16} \quad (2)$$

FIG. 2 shows the mappings in the case in which OFFSET=6.

Although in FIG. 2 the statically-named region 20S is provided by the lower-numbered K registers the statically-named region could be provided by the higher-numbered registers (e.g. the K or (D−K) higher-numbered registers) instead. As described later, the use of the lower-numbered K registers is preferable in the case in which the mapping offset value OFFSET increases when the registers are renamed. In the case in which the mapping offset value OFFSET decreases when the registers are renamed, the use of the higher-numbered registers as the statically-named registers may be preferable.

Figure 3:
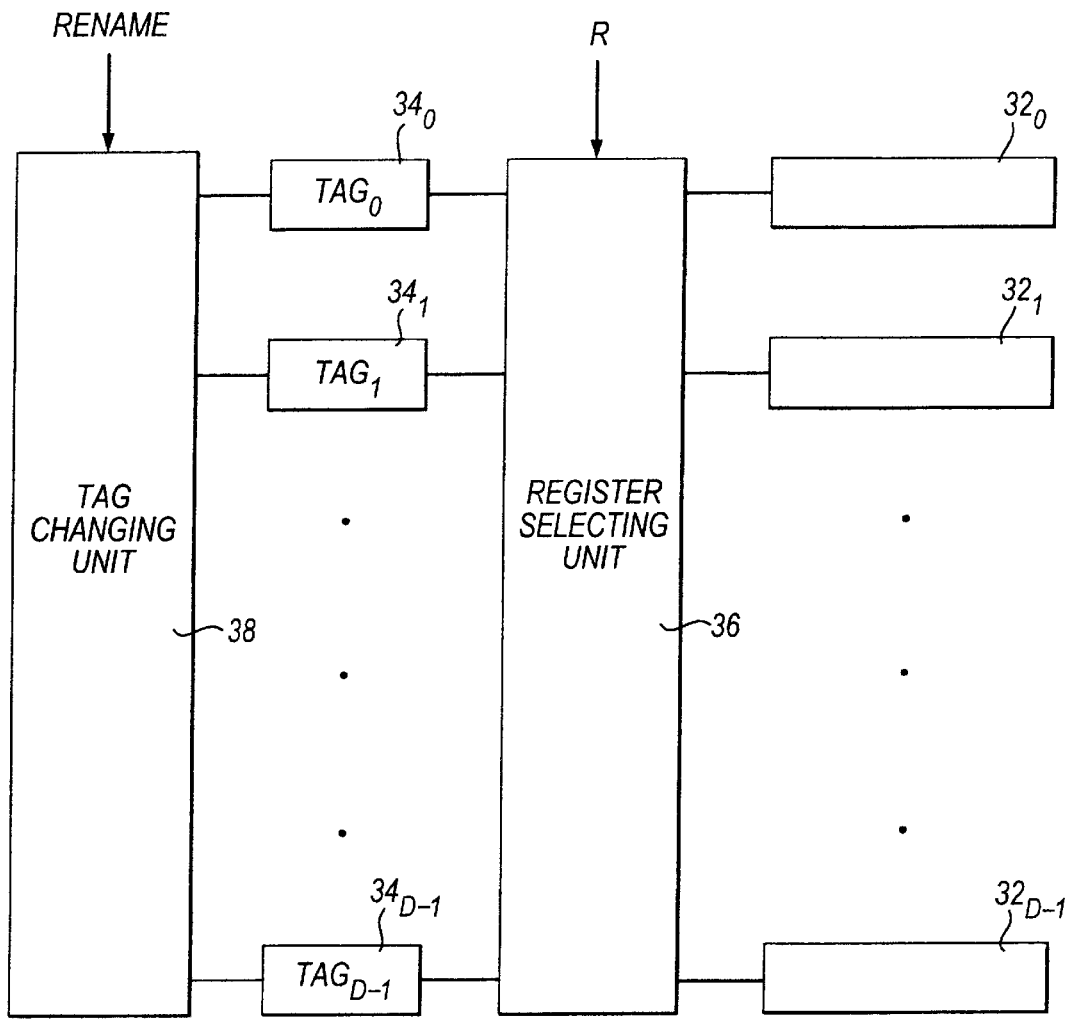
FIG. 3 shows a block diagram of register file circuitry embodying the present invention.

FIG. 3 shows parts of register file circuitry 20 in the FIG. 1 processor. The circuitry 20 comprises a plurality D of physical registers $32_0$ to $32_{D-1}$ and a plurality D of tag storing portions $34_0$ to $34_{D-1}$. These tag storing portions $34_0$ to $34_{D-1}$ correspond respectively to the physical registers $32_0$ to $32_{D-1}$. Each tag storing portion is used for storing a tag $TAG_0$ to $TAG_{D-1}$ representing a logical register identifier allocated to the corresponding physical register $32_0$ to $32_{D-1}$.

The FIG. 3 circuitry further comprises a register selection unit 36 which receives a logical register identifier R and selects that one of the physical registers $32_0$ to $32_{D-1}$ whose tag $TAG_0$ to $TAG_{D-1}$ matches the received logical register identifier R. After one of the physical registers $32_0$ to $32_{D-1}$ has been selected in this way, a desired operation may be performed on the selected register, for example an access (read or write) operation.

The FIG. 3 circuitry further comprises a tag changing unit 38 which is capable of changing the stored tags $TAG_0$ to $TAG_{D-1}$ so as to change the logical register identifier(s) allocated to one or more physical registers $32_0$ to $32_{D-1}$.

Figure 4:
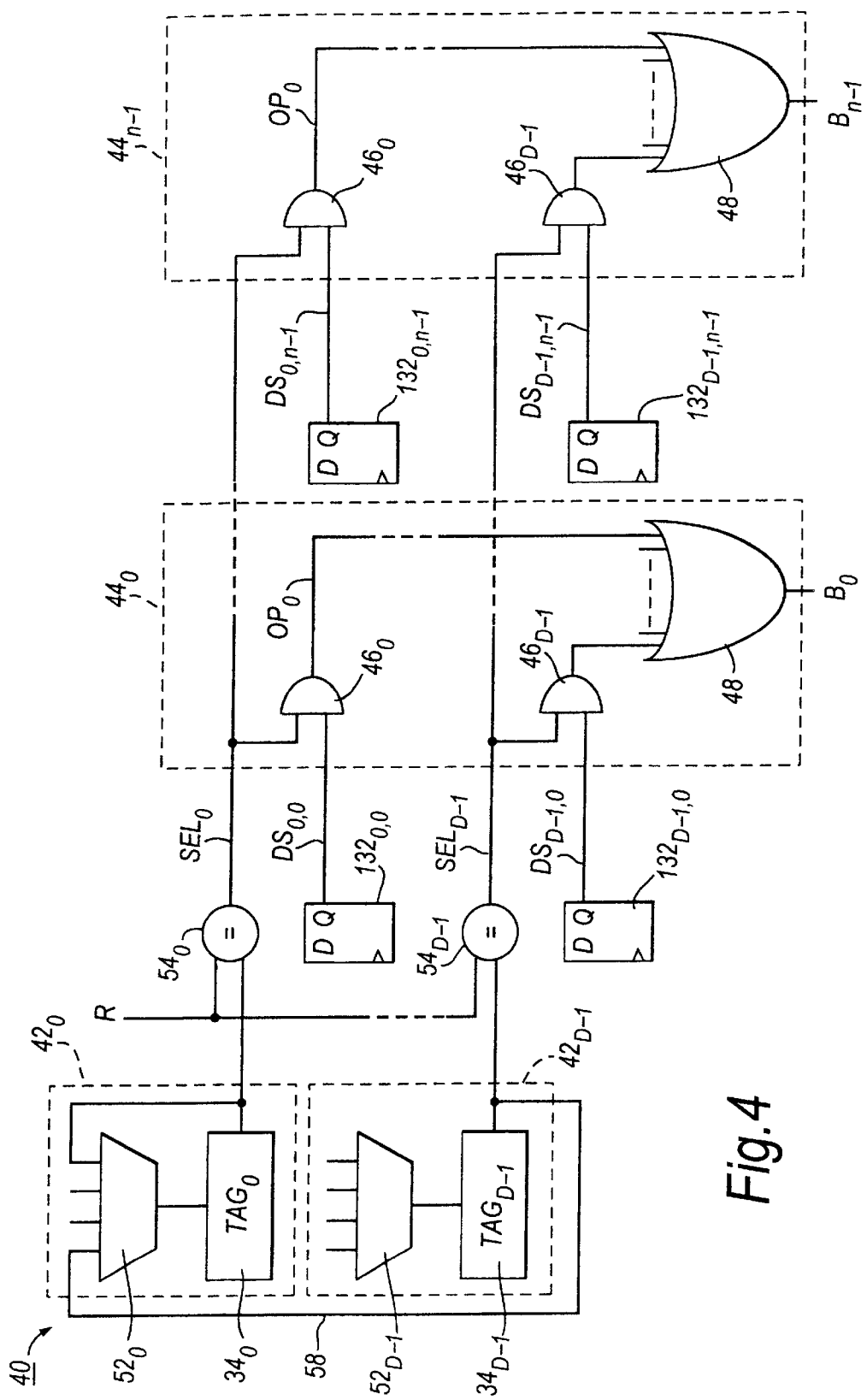
FIG. 4 is a circuit diagram of parts of register file circuitry according to a first embodiment of the present invention.

FIG. 4 shows parts of register file circuitry 40 according to a first preferred embodiment of the present invention. In FIG. 4 only certain elements of the "end" (first and last) physical registers $32_0$ and $32_{D-1}$ are shown. In this embodiment, each of the physical registers $32_0$ to $32_{D-1}$ is an n-bit register for storing an n-bit data word (n=32, for example), and FIG. 4 shows example register elements $132_{0,0}$ and $132_{0,n-1}$ for physical register $32_0$, and example register elements $132_{D-1,0}$ and $132_{D-1,n-1}$ for physical register $32_{D-1}$. The register element $132_{0,0}$ is used for storing bit 0 of the n-bit data word stored in physical register $32_0$. The register element $132_{0,n-1}$ is used for storing bit n−1 of the same word. Similarly, the register elements $132_{D-1,0}$ and $132_{D-1,n-1}$ are used for storing bits 0 and n−1 of the n-bit data word stored in physical register $32_{D-1}$. It will be appreciated that there are respective further register elements for all other bits of the physical registers $32_0$ and $32_{D-1}$, and that all remaining physical registers also have the same register-element structure.

The FIG. 4 embodiment also comprises a plurality n of output units $44_0$ to $44_{n-1}$. There is one such output unit 44 per bit of the physical registers $32_0$ to $32_{D-1}$. Each output circuit $44_i$ (i=0 to n−1) receives D selection signals $SEL_0$ to $SEL_{D-1}$. Each output circuit $44_i$ also receives D data signals $DS_{0,i}$ to $DS_{D-1,i}$. Each output circuit $44_i$ comprises D AND gates $46_0$ to $46_{D-1,i}$, each receiving at one of its inputs one of the selection signals $SEL_0$ to $SEL_{D-1}$ and each receiving at its other input one of the data signals $DS_{0,i}$ to $DS_{D-1,i}$. The AND gates $46_0$ to $46_{D-1}$ produce respective output signals $OP_0$ to $OP_{D-1}$. These output signals are applied to respective inputs of a D-input OR gate 48. The OR gate 48 produces a bit signal $B_i$ for its output unit $44_i$. Thus, as shown in FIG. 4 the output unit $44_0$ produces the bit signal $B_0$ and the output unit $44_{n-1}$ produces a bit signal $B_{n-1}$.

The FIG. 4 circuitry also comprises a plurality D of tag management units $42_0$ to $42_{D-1}$. There is one such tag management unit for each physical register $32_0$ to $32_{D-1}$. In this embodiment, each tag management unit $42_i$ (i=0 to D−1) comprises one tag storing portion (the portion $34_i$) from among the tag storing portions $34_0$ to $34_{D-1}$ of FIG. 3. This tag storing portion $34_i$ corresponds individually to the physical register $32_i$.

In this embodiment, each tag management unit 42 further comprises a multiplexer 52. The structure and operation of the tag management units 42 will be described in more detail later with reference to FIG. 5.

The FIG. 4 circuitry 40 also comprises D comparator elements $54_0$ to $54_{D-1}$, each corresponding to one of the physical registers $32_0$ to $32_{D-1}$. These D comparator elements $54_0$ to $54_{D-1}$ collectively correspond to the register selection unit 38 in FIG. 3. Each comparator element 54 receives at a first input thereof a signal R specifying the logical register number of a physical register to be selected. Each comparator element 54 also receives at a second input thereof the tag held in the tag storing portion $34_0$ of its corresponding physical register. For example, the comparator element $54_0$ receives at its second input the tag $TAG_0$ held in the tag storing portion $34_0$ which corresponds to physical register $32_0$. Each comparator element $54_0$ to $54_{D-1}$ produces one of the above-mentioned selection signals $SEL_0$ to $SEL_{D-1}$ applied to the output units $44_0$ to $44_{n-1}$.

Figure 5:
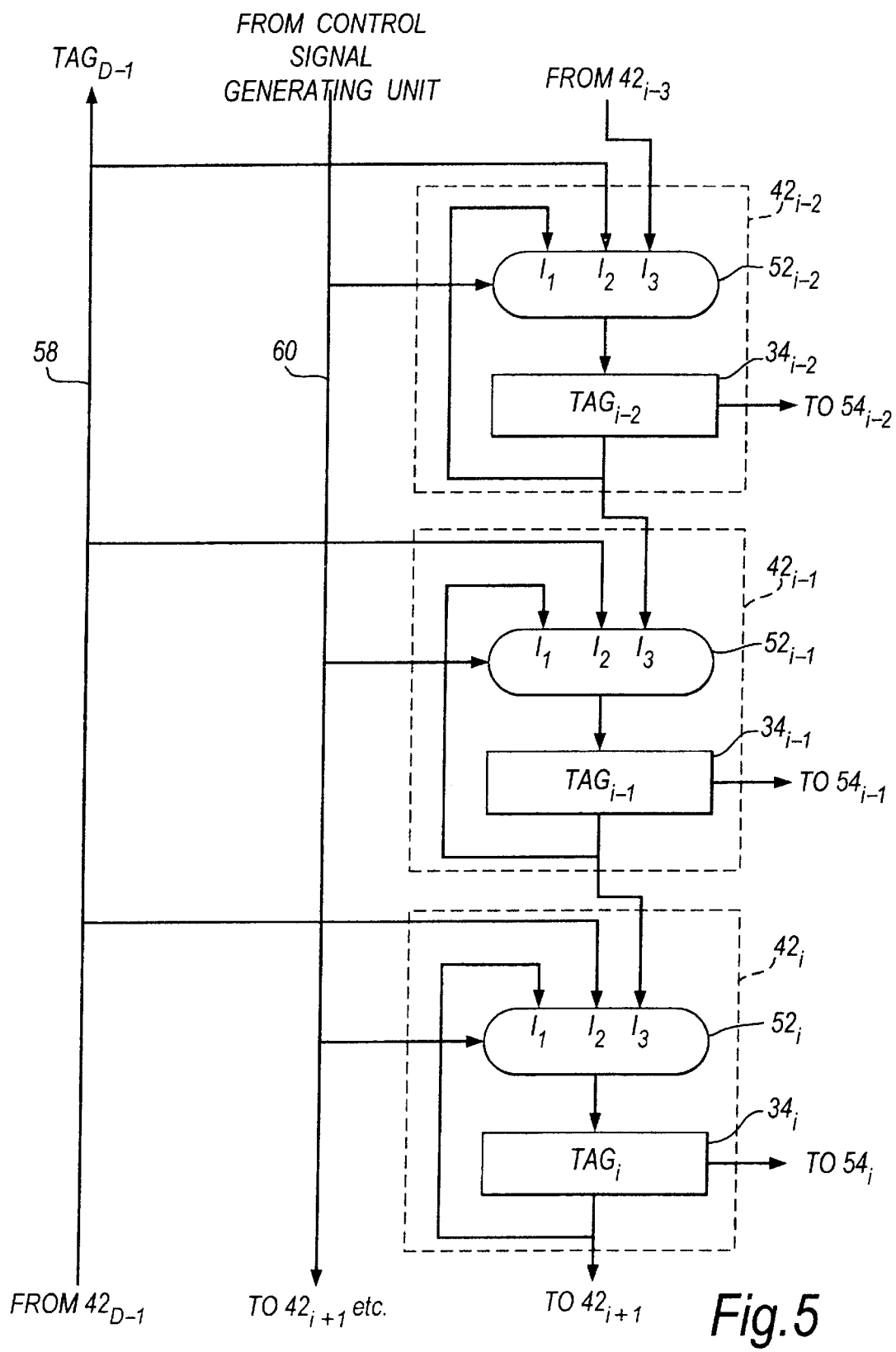
FIG. 5 shows, in more detail than FIG. 4, parts of the FIG. 4 register file circuitry.

FIG. 5 shows the tag management units 42 of FIG. 4 in more detail. In FIG. 5, three tag management units $42_{i-2}$, $42_{i-1}$ and $42_i$ are shown. The multiplexer 52 in each tag management unit 42 has a set of data inputs, of which three are shown in FIG. 5. A first data input $I_1$ is simply fed back from an output of the tag storing portion 34 in the tag management unit 42 concerned. Thus, this first data input $I_1$ receives the unit's own stored tag. A second data input $I_2$ is connected to a bus line 58 provided in common for all units. The bus line 58 is connected (see FIG. 4) to an output of the tag storing portion $34_{D-1}$ in the last tag management unit $42_{D-1}$. Thus, this second data input $I_2$ receives the tag $TAG_{D-1}$. A third data input $I_3$ is connected to an output of the tag storing portion 34 in the preceding tag management unit 42. Thus, this third data input $I_3$ receives the tag stored in the preceding tag management unit 42. For example, the third data input $I_3$ of the multiplexer $52_{i-1}$ in the tag management unit $42_{i-1}$ receives the tag $TAG_{i-2}$ stored in the preceding tag management unit $42_{i-2}$.

The multiplexer 52 in each tag management unit 42 also has a data output which is connected to an input of the tag storing portion 34 in the tag management unit concerned.

The output of the tag storing portion 34 in each tag management unit 42 is also connected to the second input of a corresponding one of the comparator elements $54_0$ to $54_{D-1}$ as already described.

Each tag management unit 42 also has control inputs which receive control signals via bus lines 60. These control signals, which are used to control operation of the tag management units, are generated by a control signal generating unit (not shown in FIG. 5), as described in detail later with reference to FIG. 13.

Figure 6:
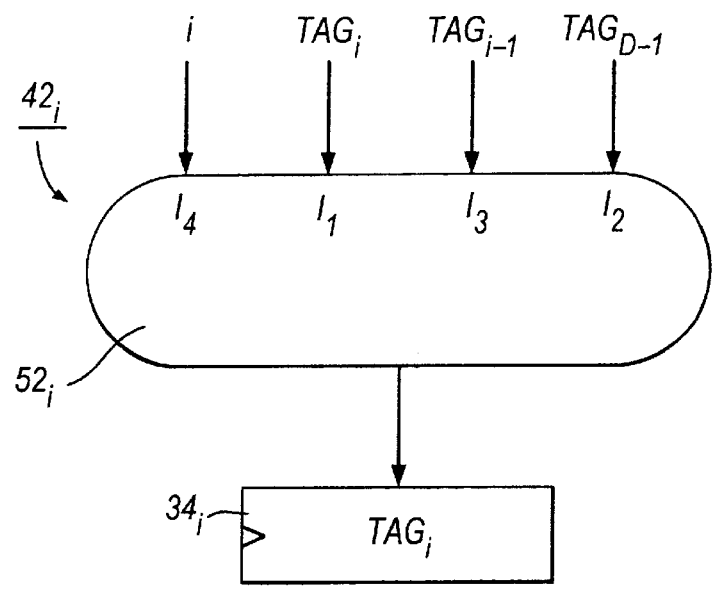
FIG. 6 shows parts of a tag management unit used in the first embodiment.

FIG. 6 shows the multiplexer $52_i$ in the tag management unit $42_i$. In addition to the first to third data inputs $I_1$ to $I_3$ mentioned above, the multiplexer also has a fourth input $I_4$ which is connected for receiving a fixed value i, i.e. the unit number of its tag management unit $42_i$. This fourth data input $I_4$ is used for initialising the tag stored in each tag management unit 42 in a reset operation, as will be described in more detail later.

Figure 7:
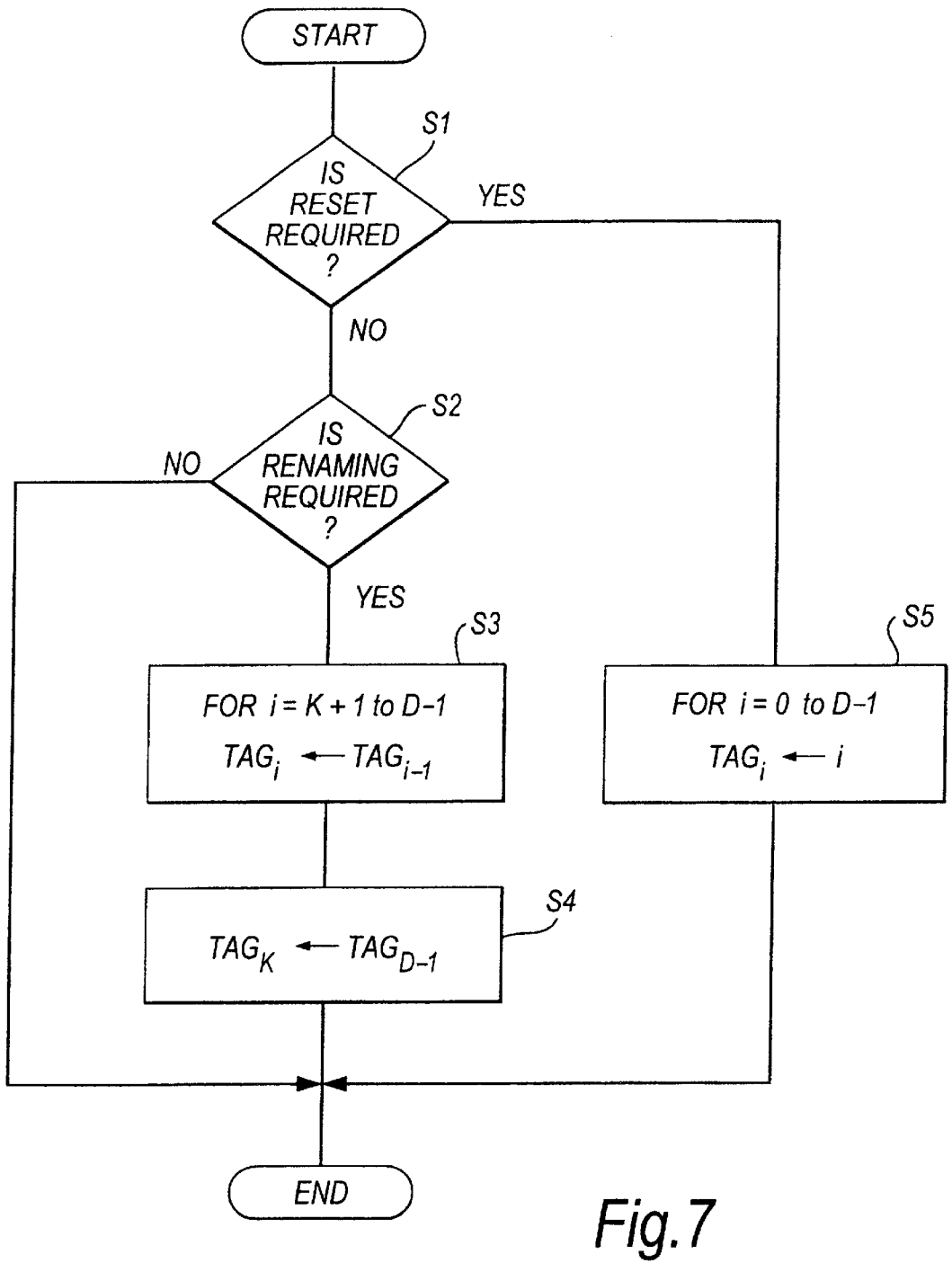
FIG. 7 shows a flowchart for use in illustrating operation of the first embodiment.

Referring now to FIG. 7, operation of the first embodiment will now be described. The operations shown in FIG. 7 are carried out in each processor cycle.

In step S1 it is determined whether the register file circuitry is required to be reset. Such a reset operation is required, for example, when the processor is powered-up or when the boundary between the statically- and dynamically-named regions 20S and 20R of the register file is changed. If, in step S1, it is determined that a reset operation is required, each of the tag management units $42_0$ to $42_{D-1}$ causes its multiplexer 52 to select its fourth data input ($I_4$ in FIG. 6). As a result, the multiplexer 52 outputs the unit number of the tag management unit concerned and, at the next active clock edge, the unit number is stored in the tag storing portion 34 of the tag management unit (step S5). The process then ends.

If, in step S1, it is determined that a reset is not required, it is checked in step S2 whether or not renaming of the registers in the dynamically-named region 20R of the register file is required. Such a renaming operation may be required when a new iteration of a software-pipelined loop is initiated. In this event, for example, the processor may assert a RENAME control signal which is applied to the register file circuitry 20 (FIG. 1).

If no renaming operation is required the process ends. Otherwise, in steps S3 and S4 the tags corresponding to the physical registers in the dynamically-named region 20R of the register file are cyclically "rotated".

In particular, in step S3, for each tag management unit $42_i$, where i=K+1 to D−1, the tag management unit causes its multiplexer 52 to select its third input ($I_3$ in FIG. 6). As a result, the multiplexer 52 outputs the tag $TAG_{i-1}$ stored in the tag storing portion $34_{i-1}$ of the preceding tag management unit $42_{i-1}$. At the next active clock edge, this tag $TAG_{i-1}$ becomes stored in the tag storing portion $34_i$ of the tag management unit $42_i$.

The tag stored in the last of the tag management units $42_{D-1}$ must wrap around to the tag management unit $42_K$ corresponding to the first of the physical registers in the dynamically-named region 20R. Accordingly, in step S4 the tag management unit $42_K$ causes its multiplexer 52 to select its second input ($I_2$ in FIG. 6). As a result, the multiplexer 52 in that unit outputs the tag $TAG_{D-1}$ received from the tag management unit $42_{D-1}$ via the bus line 58. At the next active clock edge, this tag $TAG_{D-1}$ is stored in the tag storing portion $34_K$.

It will be appreciated that in the operations shown in FIG. 7, except when a reset is required, the tags $TAG_0$ to $TAG_{K-1}$ corresponding to physical registers in the statically-named region 20S are left unchanged. Thus, these tags retain the values 0 to K−1 to which they are initialised respectively in the reset operation of step S5. Consequently, for the physical registers in the statically-named region 20S of the register file, the logical register number is always mapped directly to the identical physical register number, i.e. physical register $32_0$ always has logical register number 0 (i.e. $TAG_0=0$), physical register $32_1$ always has logical register number 1($TAG_1=1$, etc).

It will be appreciated that in the FIG. 4 embodiment the changes in the tags corresponding to the physical registers in the dynamically-named region are achieved simply by shifting (rotating) the tags in circular manner through the tag storing portions corresponding to those physical registers. Such cyclical shifting can be performed very quickly, as it involves no arithmetic or other complex data processing operation.

The comparator elements $54_0$ to $54_{D-1}$ and the output circuits $44_0$ to $44_{n-1}$ together constitute a read port, responsive to the R signal to select the physical register whose corresponding tag matches the logical register number specified by the R signal and to output the n-bits of the data word stored in the selected physical register as the bit signals $B_0$ to $B_{n-1}$.

As the tags corresponding to the physical registers are always mutually-different, even after renaming of the registers has occurred, at any one time there is only one comparator element 54 whose stored tag will match the logical register number specified by the R signal. Thus, only that one comparator element sets its selection signal SEL to the active state (1), and all of the remaining selection signals are in the inactive state (0). Accordingly, in each of the output units $44_0$ to $44_{n-1}$ only one of the AND gates 46 receives an active selection signal SEL and is enabled, the remaining AND gates being disabled. The output signal OP of the single enabled AND gate 46 becomes equal to the bit of the data word stored in the register element 132 to which that AND gate is connected. For all disabled AND gates the output signal OP is inactive (0). Accordingly, the OR gate 48 in each output unit 44 simply serves to deliver, as its bit signal B, the output signal OP of the single enabled AND gate 46, i.e. the register-element bit received by that AND gate.

Because the comparator elements $54_0$ to $54_{D-1}$ operate in parallel with one another the register selection operation is performed extremely quickly. Also, because the output units $44_0$ to $44_{n-1}$ operate in parallel with one another the read operation for the selected register is also performed extremely quickly.

Operation of the FIG. 4 embodiment will be illustrated by reference to an example with reference to FIGS. 8 to 12. In this example, it is assumed for simplicity that the register file has just four physical registers in total (i.e. D=4), and that initially physical register 0 only is in the statically-named region, with the remaining physical registers 1, 2 and 3 being in the dynamically-named region (K=1).

Figure 8:
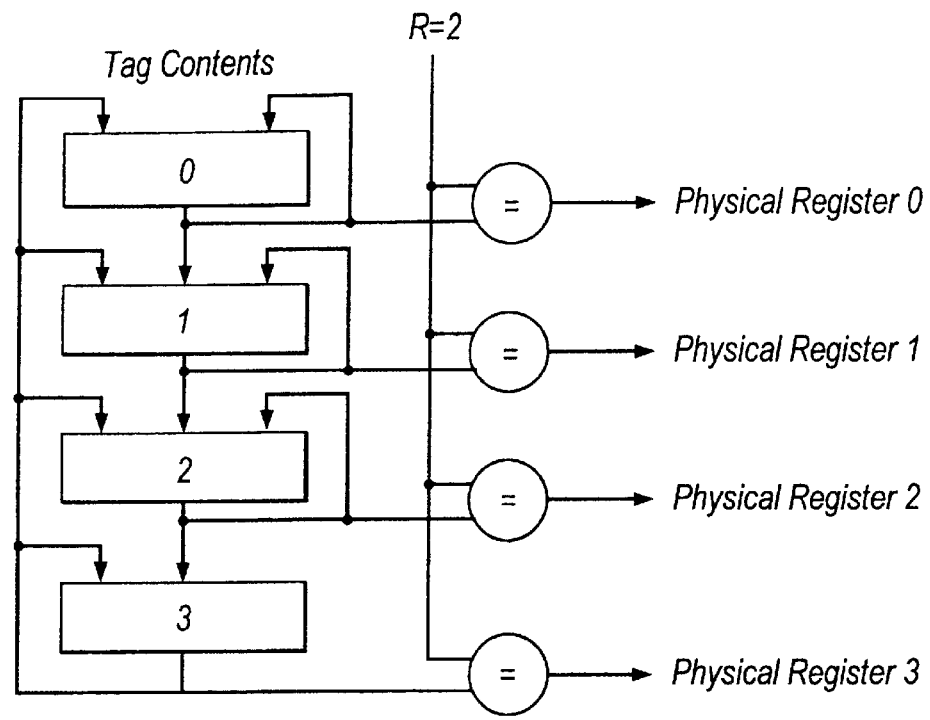
FIGS. 8 to 12 are schematic views for use in explaining operation of the first embodiment.

In FIG. 8, the state of the tags immediately after a reset operation is shown.

Figure 9:
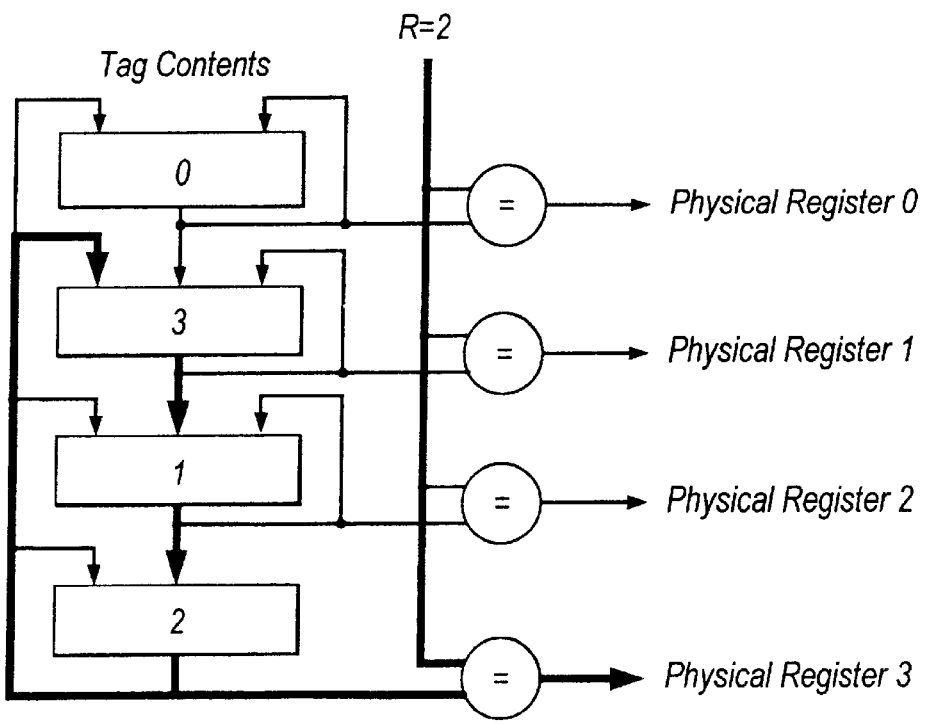

FIG. 9 shows the tag contents after a first renaming operation has been carried out. The tag $TAG_0$ is still left at 0. However, as shown by the thick arrows in FIG. 9, the tags corresponding to the physical registers 1, 2 and 3 have been rotated cyclically by one position. Accordingly, when a logical register number R=2 is applied to the comparator elements $54_0$ to $54_{D-1}$ the physical register 3 is selected because its corresponding tag now has the value 2.

Figure 10:
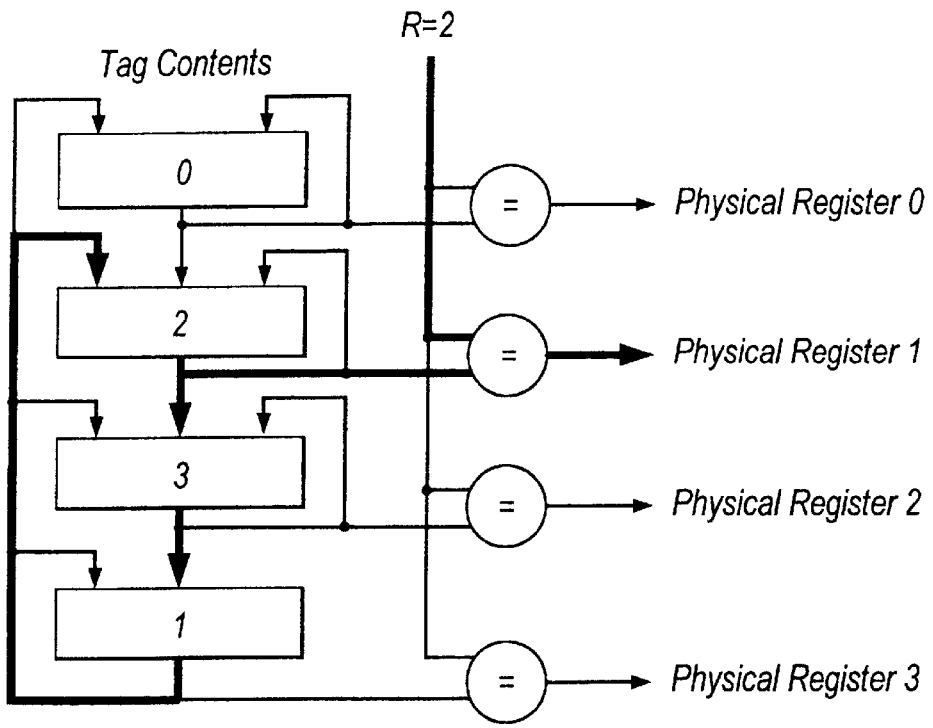

FIG. 10 shows the tag contents after a second renaming operation. After this operation, the logical register number 2 is stored in the tag corresponding to physical register 1. Accordingly, when the logical register number R=2 is supplied to the comparator elements $54_0$ to $54_{D-1}$ the physical register 1 is selected.

Figure 11:
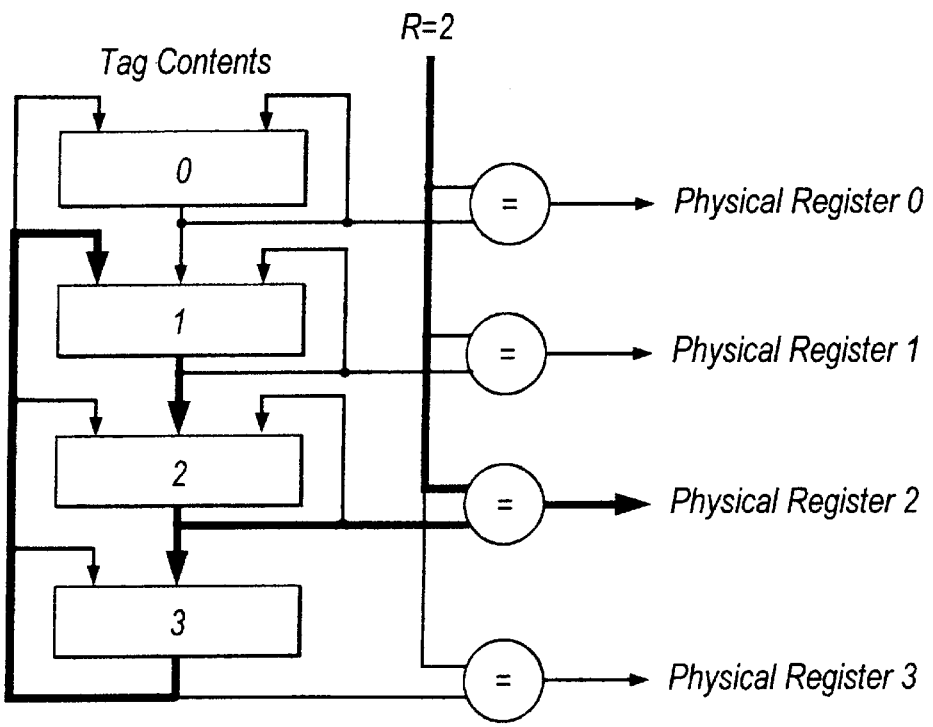

After a third renaming operation, the tag contents have the state shown in FIG. 11. This is the same state as in FIG. 8 (reset state). Thus physical register 2 is selected in response to logical register number 2.

After reaching the state shown in FIG. 11 it is assumed that K is then changed from its original value 1 to a new value 2. Such a change in K is permitted only after the tags have been reset to the state shown in FIG. 8. In this example, it so happens that the tags have returned to their reset state in FIG. 11 before the change in K. However, in the general case, a reset operation must be performed before any change in K.

Figure 12:
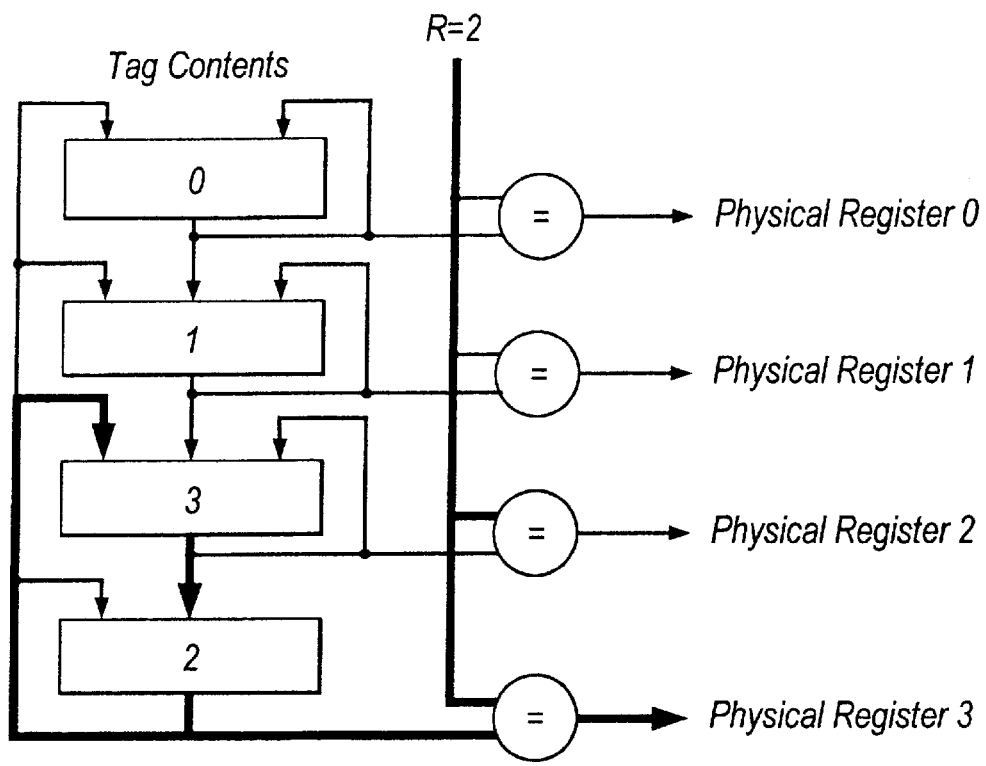

FIG. 12 shows the tag states when, following the change in K, a first renaming operation has been performed. Now that K is 2, the tags for physical registers 0 and 1 remain set at 0 and 1 respectively after the renaming operation. The tags for physical registers 2 and 3 in the dynamically-named region have been rotated cyclically. Accordingly, physical register 3 is selected in response to logical register number 2.

It is possible to modify the FIG. 4 embodiment to provide more than one read port. This can be done by simply providing, for each additional read port, another set of D comparator elements corresponding to the comparator elements $54_0$ to $54_{D-1}$ in FIG. 4, and another set of n output units corresponding to the output units $44_0$ to $44_{n-1}$ in FIG. 4. When two or more read ports are provided in this way, the read ports operate in parallel with one another with each set of comparator elements receiving a different R signal specifying the logical register number of the physical register to be read by the read port concerned.

The output units $44_0$ to $44_{n-1}$ in the or each read port can be implemented in many other ways than as shown in FIG. 4. For example, the output units for the or each read port could be implemented by D tristate drivers, each activated by a different one of the selection signals $SEL_0$ to $SEL_{D-1}$ to output the data word held in the corresponding physical register. The outputs of the tristate drivers are connected in common to an output of the read port, with each non-activated tristate driver setting its output to a high-impedance state.

Also, in place of the read port as shown in FIG. 4 any other suitable circuitry can be provided for performing a desired operation on the selected physical register. The desired operation could be a write operation or a clear operation, for example.

Figure 13:
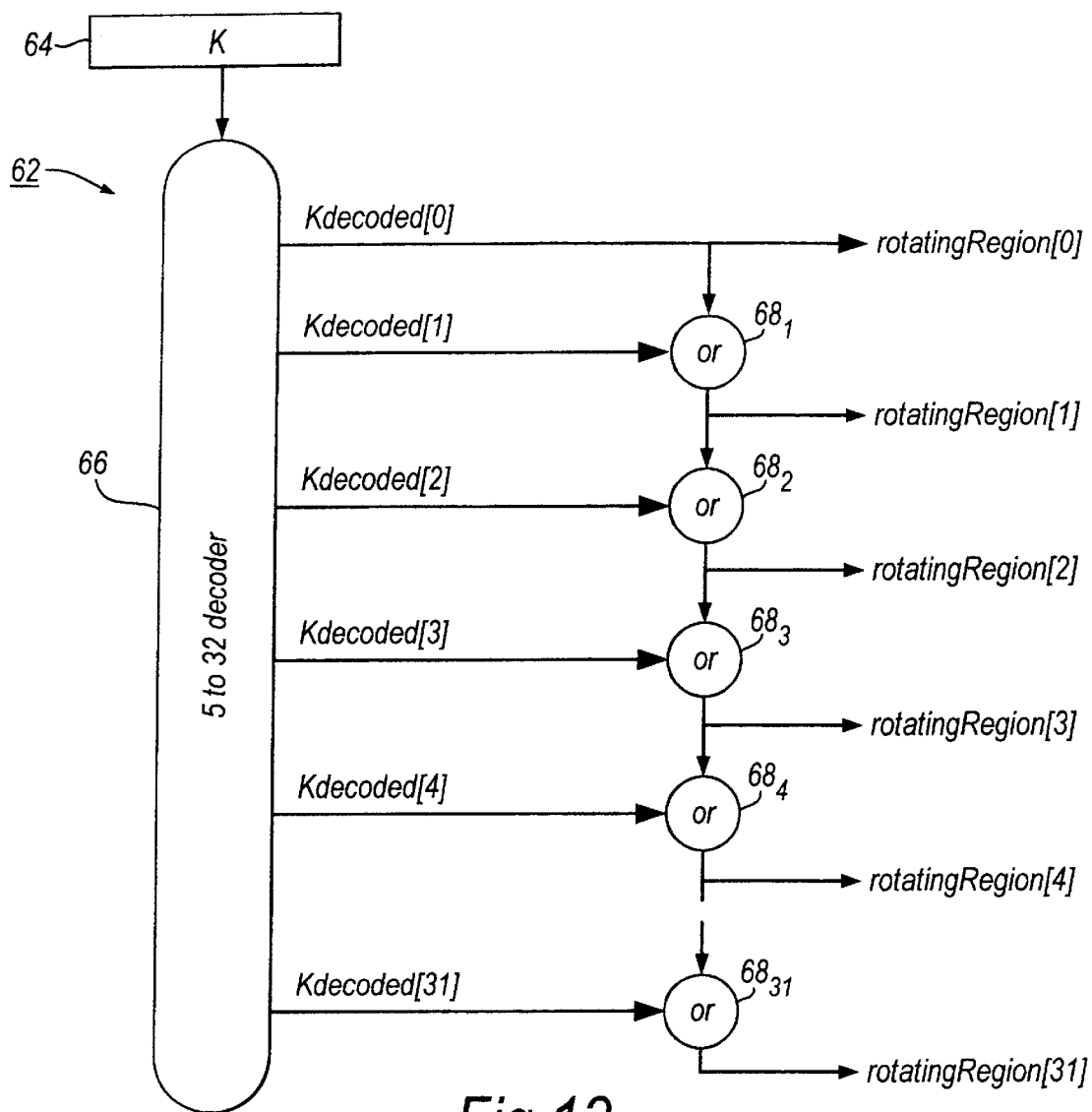
FIG. 13 shows parts of a control signal generating circuit used to provide control signals in the first embodiment.

In the FIG. 4 embodiment the tag management units $42_0$ to $42_{D-1}$ are controlled by control signals provided thereto by a control signal generating unit. FIG. 13 shows parts of a control signal generating unit suitable for use in the FIG. 4 embodiment.

The FIG. 13 control signal generating unit 62 comprises a register 64, a decoder 66 and a plurality of OR gates $68_1$ to $68_{31}$. In this example, it is assumed that the total number D of physical registers in the register file circuitry is 32. This means that, in this example, the number of OR gates required is 31 for reasons that will become apparent.

The register 64 is a 5-bit register in this example, used for storing the current value of K. The stored K value is applied to an input of the decoder 66. The decoder 66 is a 5-to-32 decoder with 32 outputs. Respective decoded signals Kdecoded[0] to Kdecoded[31] are produced at the outputs of the decoder 66. Each OR gate receives at a first input thereof a corresponding one of the decoded signals Kdecoded[0] to Kdecoded[31]. Each of the OR gates $68_2$ to $68_{31}$ also receives at a second input thereof an output signal rotatingRegion[1] to rotatingRegion[30] of the preceding one of the OR gates $68_1$ to $68_{30}$. In the case of the OR gate $68_1$ the decoded signal Kdecoded[0] is applied to the second input. That decoded signal Kdecoded[0] is used directly to provide a further output signal rotatingRegion[0]. The output signals rotatingRegion[0] to rotatingRegion[31] are supplied respectively to the tag management units $42_0$ to $42_{31}$ in FIG. 4.

The control signal generating unit 62 operates as follows. The decoder 66 receives the stored K value and sets the decoded signal Kdecoded[K] to the active state (1), each other decoded signal being inactive (0). Accordingly, the OR gate $^{68}$K sets its output signal rotatingRegion[K] to the active state (1) (if K=0, the output signal rotatingRegion[0] simply becomes active directly through the decoded signal Kdecoded[0] becoming active).

The active state of the output signal rotatingRegion[K] then propagates through the OR gates $68_{K+1\ to\ 6831}$, so that all of the output signals rotatingRegion[K+1] to rotatingRegion[31] also become active (1).

From this it can be observed that the tag management units $42_K$ to $42_{31}$ which manage the tags corresponding to the physical registers $32_K$ to $32_{31}$ in the dynamically-named region 20R of the register file receive respective output signals rotatingRegion[K] to rotatingRegion[31] which have the active state, whilst the remaining tag management units $42_0$ to $42_{K-1}$ receive respective inactive output signals rotatingRegion[0] to rotatingRegion[K−1]. In this way, each tag management unit receives a control signal which indicates in which region 20S or 20R its corresponding physical register is placed.

Figure 14:
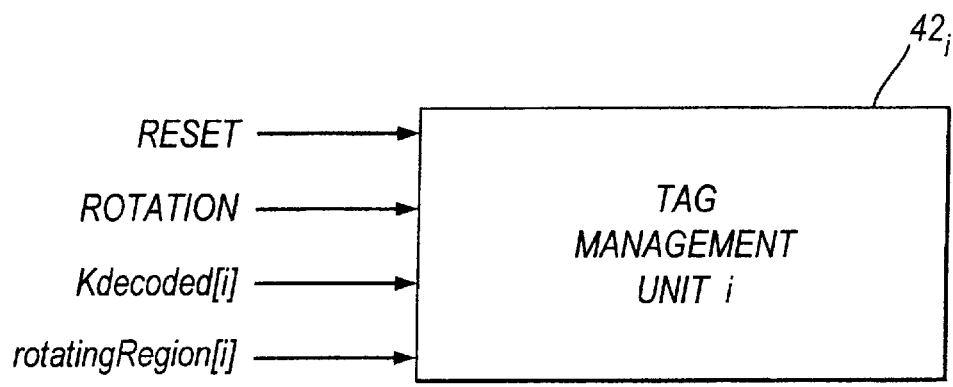
FIG. 14 shows a schematic view for illustrating control signals used in the first embodiment.

As shown in FIG. 14, apart from receiving the control signal rotatingRegion[i], each tag management unit $42_i$ also receives two further control signals RESET and ROTATION from the control signal generating unit 62. The RESET signal is set to the active state (1) when a reset operation of the tags is required (as checked for in step S1 of FIG. 7). When the ROTATION signal is inactive (0) no renaming of the registers is required (as checked for in step S2 in FIG. 7). Each tag management unit $42_i$ also receives the decoded signal Kdecoded[i] from the control signal generating unit 62.

Figure 15:
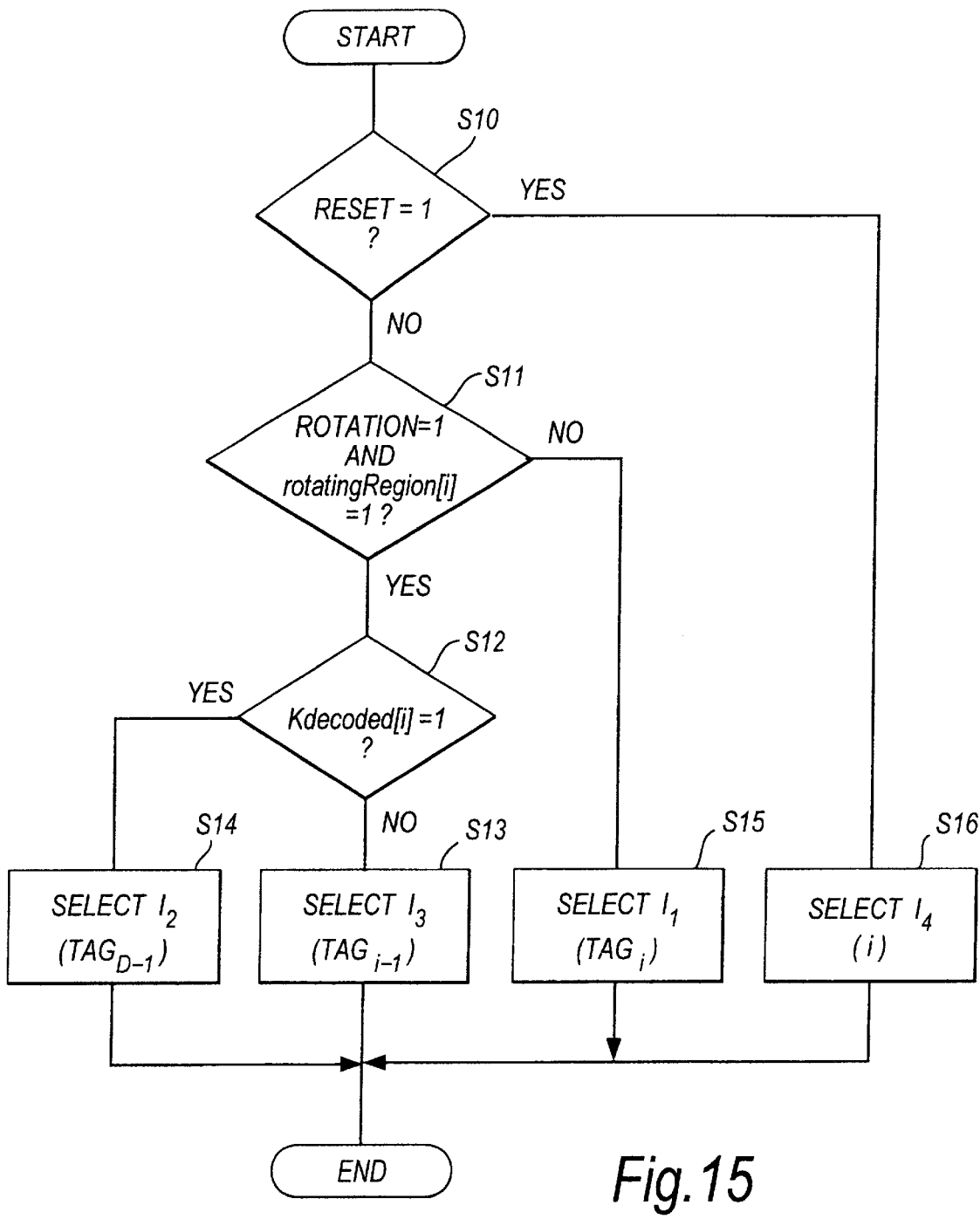
FIG. 15 shows a flowchart for illustrating operation of the tag management unit of FIG. 6.

Referring now to FIG. 15, the operations carried out by the traffic management unit $42_i$ in response to the control signals applied thereto will now be explained.

In step S10 it is checked whether the RESET signal is active (1). If so, processing proceeds to step S16 in which the multiplexer $52_i$ selects its fourth data input, i.e. the unit's own identity number i. Processing then ends.

If, in step S10, the RESET signal is not active, it is checked in step S11 whether the ROTATION signal and the rotatingRegion[i] signal are both active (1). If either signal is inactive, processing proceeds to step S15 in which the multiplexer $52_i$ selects its first data input $I_1$. Thus, in this case, there is no change to the stored tag $TAG_i$.

If, in step S11, the ROTATION signal and the rotatingRegion[i] signal are both active (1) processing proceeds to step S12. In step S12 the Kdecoded[i] signal is examined to determine whether or not the physical register $32_i$ corresponding to the tag management unit $42_i$ is the first register in the dynamically-named region 20R of the register file. If it is the first register, then the signal Kdecoded[i] is active (1) and step S14 is carried out in which the multiplexer $32_i$ selects its second data input. As a result, the stored tag becomes set to the tag $TAG_{D-1}$.

If the signal Kdecoded[i] is inactive in step S12, then the tag management unit $42_i$ is not the first register in the dynamically-named region and, in step S13, the multiplexer $52_1$ selects its third data input $I_3$. In this case, the stored tag is set equal to the tag $TAG_{i-1}$ of the preceding tag management unit $42_{i-1}$.

It can be seen from FIG. 15 that, because the stored tags rotate cyclically through the dynamically-named region 20R with the mapping offset value OFFSET (FIG. 2) increasing each time the registers are renamed, the last physical register in the dynamically-named region 20R is always the last physical register $32_{D-1}$ in the register file. Thus, although any physical register can be designated as the first physical register $32_k$ in the dynamically-named region 20R, so that each tag management unit needs to be capable of obtaining the stored tag $TAG_{D-1}$ corresponding to the last physical register $32_{D-1}$ (tag "wrap-around"), each tag management unit only needs to have the tag storing portion $34_{D-1}$ as a source tag storing portion to permit such tag wrap-around, rather than needing to have every other tag storing portion as a source tag storing portion. This makes the multiplexer in each tag management unit simple to implement using a low number of gates, and also enables the multiplexer to operate quickly.

In an alternative embodiment in which the dynamically-named registers are the lower-numbered physical registers, the first physical register $32_0$ will always be the first physical register in the dynamically-named region 20R so in this case tag wraparound is possible when the tag storing portion $32_0$ (alone) is a source tag storing portion for all other tag storing portions. This corresponds to the mapping offset value OFFSET decreasing each time the registers are renamed.

In the embodiment described with reference to FIG. 4, only one renaming operation can be carried out per processor cycle. However, depending on the number of execution units in the processor that use the register file circuitry it may be desirable to permit more than one renaming operation to be carried out per processor cycle.

Figure 16:
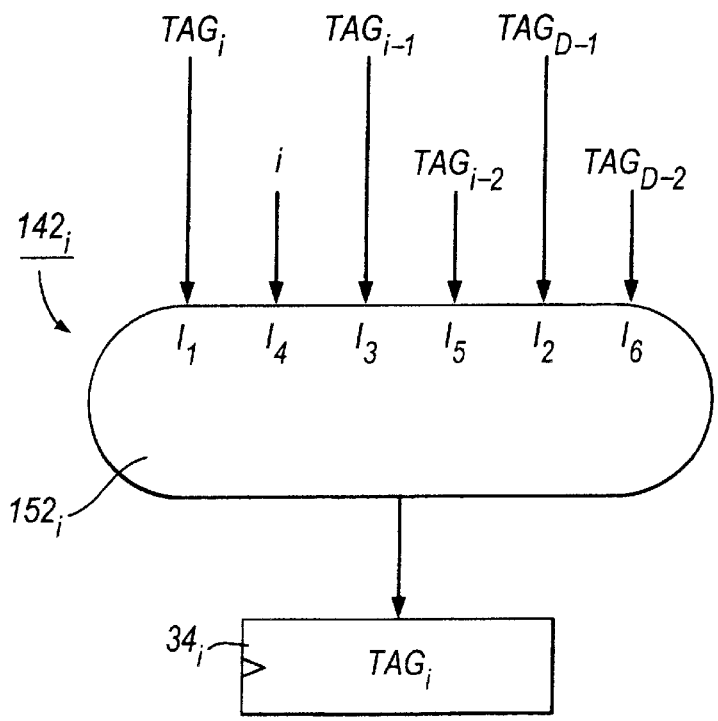
FIG. 16 shows parts of a tag management unit for use in a second embodiment of the present invention.

In register file circuitry according to a second embodiment of the present invention up to two renaming operations per processor cycle can be carried out. FIG. 16 shows parts of a tag management unit $142_i$ in the second embodiment. In place of the multiplexer $52_i$ shown in FIG. 6, a multiplexer $152_i$ is used which has six data inputs $I_1$ to $I_6$. The inputs $I_1$ to $I_4$ are connected as in the first embodiment. The fifth data input $I_5$ is connected to an output of the data storing portion $34_{i-2}$ in the tag management unit $42_{i-2}$. The sixth data input $I_6$ is connected to a bus line (not shown but similar to the bus line 58 in FIG. 5) which is connected to an output of the tag storing portion $34_{D-2}$ in the last-but-one tag management unit $42_{D-2}$.

Figure 17:
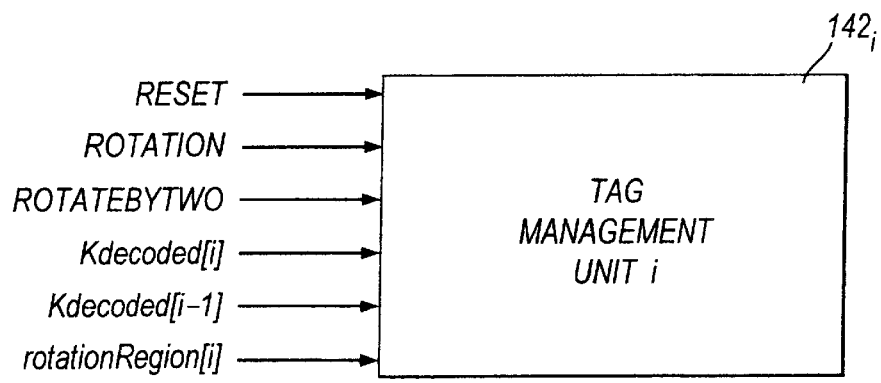
FIG. 17 shows a schematic view for illustrating control signals used in the second embodiment.

In the second embodiment, as shown in FIG. 17, additional control signals need to be supplied by the control signal generating unit to each tag management unit 142. In particular, a ROTATEBYTWO signal is supplied to each tag management unit $142_i$ in the second embodiment. This control signal is active (1) when two renaming operations are required in the current processor cycle. When one renaming operation is required in the current processor cycle the ROTATEBYTWO signal is inactive (0) and the ROTATION signal is active (1). When no renaming operation is required in the current processor cycle, the ROTATION control signal is inactive (0) and the state of the ROTATEBYTWO signal can be inactive or active ("don't care"). In addition, as shown in FIG. 17 each tag management unit $142_i$ in the second embodiment also receives the decoded signal Kdecoded[i-1]. The remaining control signals applied to the tag management unit $142_i$ in the second embodiment are the same as in the first embodiment (FIG. 14).

Figure 18A:
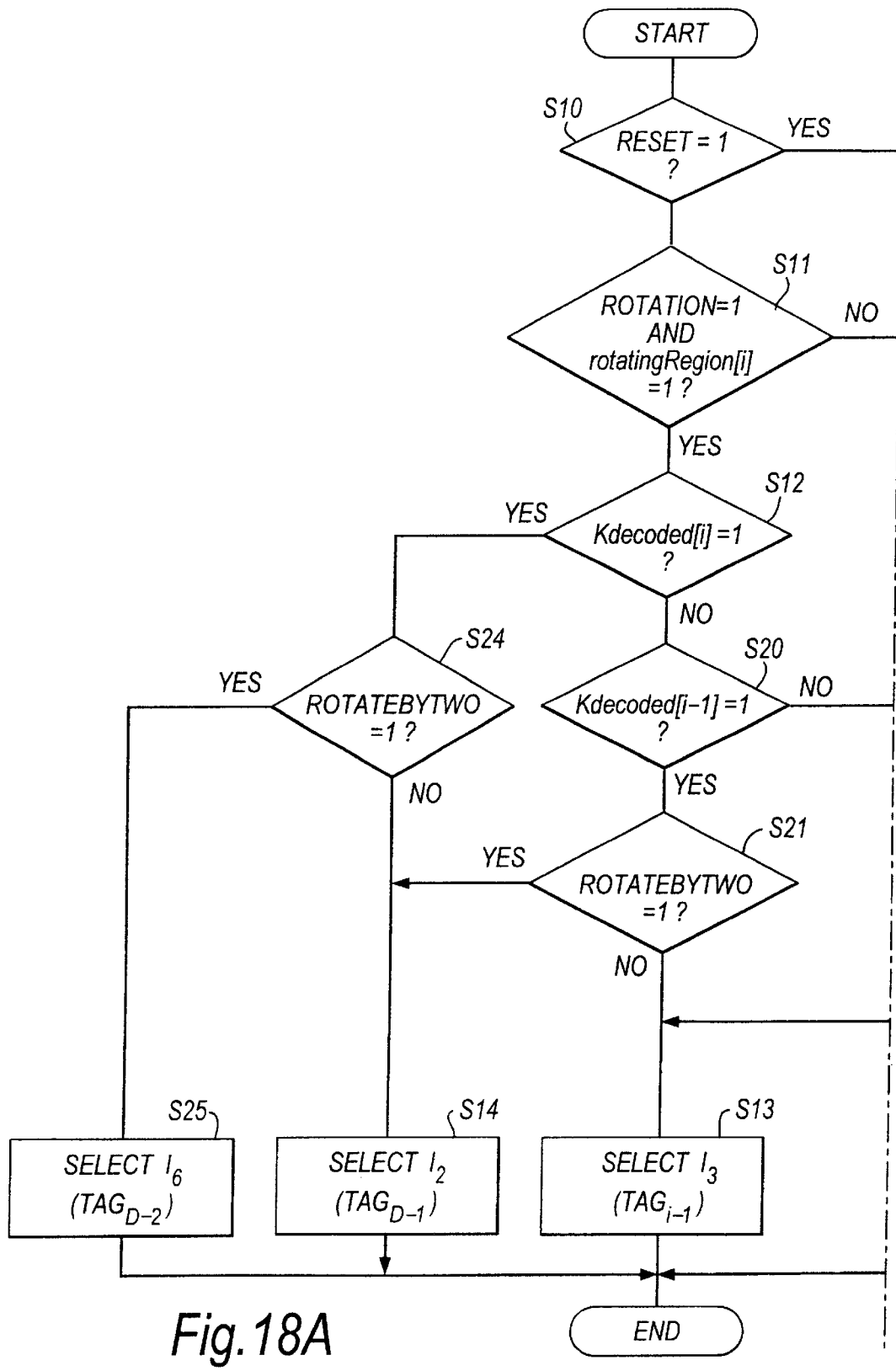
FIGS. 18(A) and 18(B) show a flowchart for use in explaining operation of the tag management unit of FIG. 16.
Figure 18B:
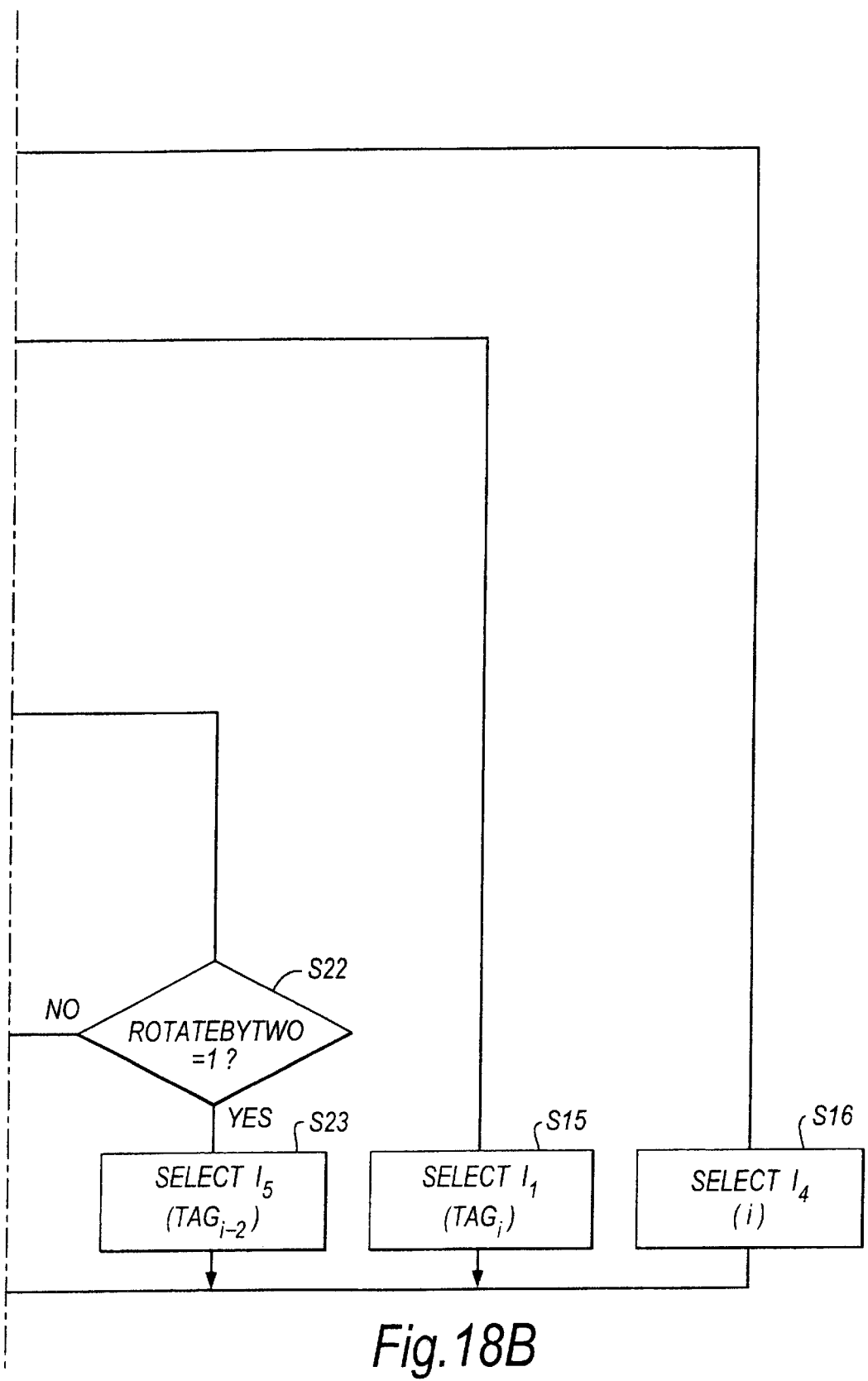

Operation of the tag management unit $142_i$ in the second embodiment will now be described with reference to FIGS. 18(A) and 18(B). In FIGS. 18(A) and 18(B) steps which are the same as steps already described with reference to FIG. 15 have been given the same reference numerals and a description of these steps is omitted. The additional steps in FIGS. 18(A) and 18(B) are steps S20 to steps S25.

In the second embodiment it is necessary for the tag management unit $142_i$ to examine not only whether its corresponding physical register is the first register in the dynamically-named region 20R but also (in the event that two renaming operations are required in the current cycle) whether its corresponding physical register is the second register in the dynamically-renameable region 20R. In step S20, having established in step S12 that its corresponding physical register is not the first register in region 20R, it is checked whether its corresponding register is the second register in that region. If so, in step S21 it is checked whether in this processor cycle two renaming operations are required (ROTATEBYTWO signal active). If two renaming operations are required, the tag management unit knows that it must select the tag $TAG_{D-1}$ of the tag management unit $42_{D-1}$ corresponding to the last physical register (which is also the last physical register in the dynamically-renameable region 20R).

If in step S21 the ROTATEBYTWO signal is inactive it follows that only one renaming operation is required in the current cycle. Accordingly, in step S13 the tag $TAG_{i-1}$ of the preceding stage is selected as in the first embodiment.

Step S24 is reached if, in step S12, it is found that the corresponding physical register $32_i$ for the tag management unit $142_i$ is the first physical register in the region 20R. In this case, if two renaming operations are required in the present processor cycle (ROTATEBYTWO signal active) then in step S25 the multiplexer $152_i$ selects its sixth data input with the result that the tag $TAG_{D-2}$ corresponding to the last-but-one physical register is stored. Otherwise, it follows that only one renaming operation is required in the current processor cycle and step S14 is carried out as in the first embodiment.

In the second embodiment the register file can carry out 0, 1 or 2 renaming operations per processor cycle. It will be appreciated, however, that in other embodiments the invention can be adapted to support any number of renaming operations per cycle by the addition of extra inputs to each multiplexer and related control logic circuitry for generating the required extra control signals.

The execution units of the processor in which registry file circuitry embodying the present invention is used may be pipelined execution units. In this case, it is desirable to provide an exception handling facility whereby the early state information in the register file circuitry is reversible. Also, it is desirable to provide a stall control facility for the register file circuitry.

Figure 19:
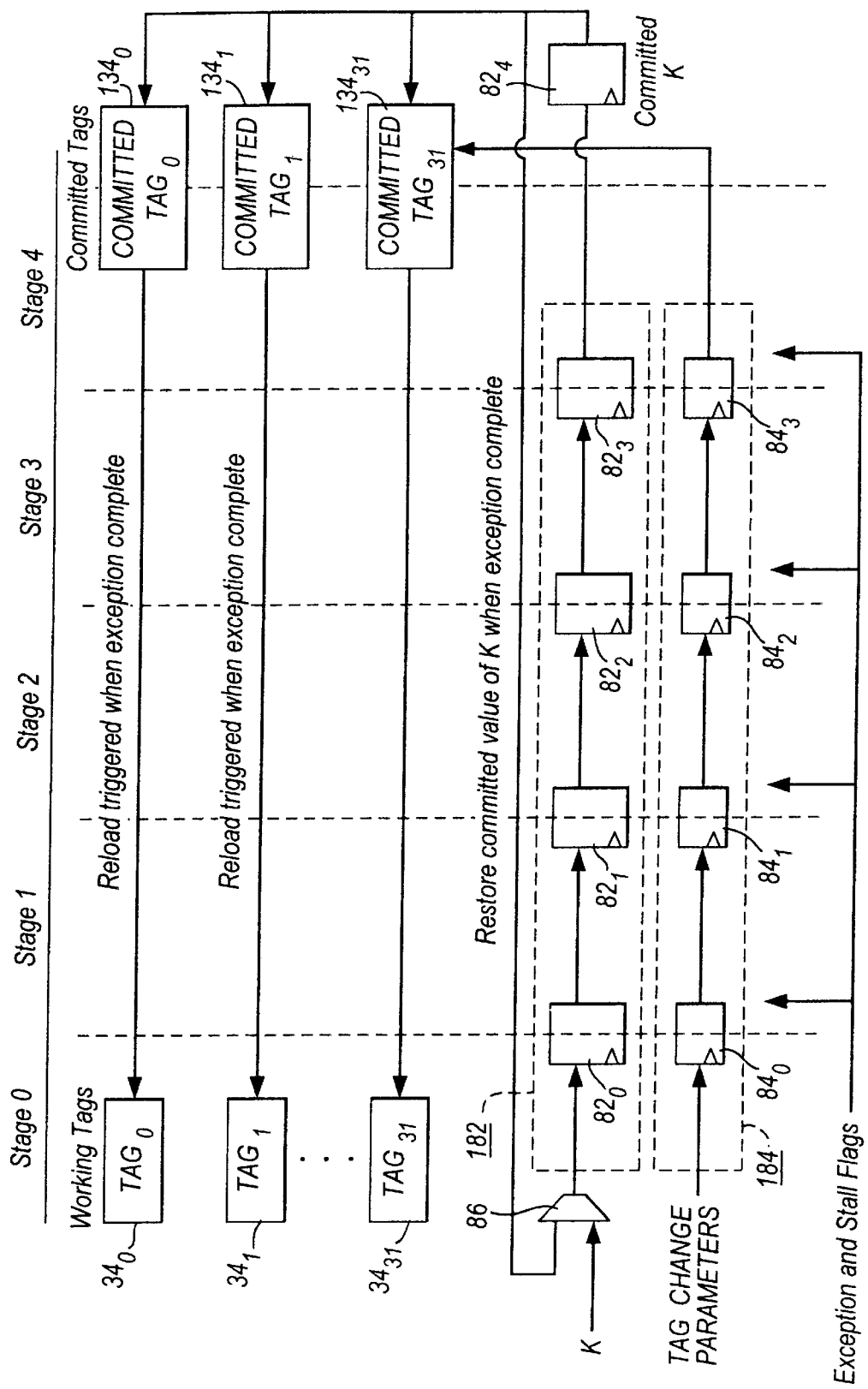
FIG. 19 shows parts of register file circuitry according to a third embodiment of the present invention.

FIG. 19 is a schematic block diagram of parts of register file circuitry 80 according to a third preferred embodiment of the present invention. In this example the register file circuitry 80 is adapted for use in a processor having five stages (stages 0 to 4) in the execution-unit pipelines. In this embodiment each physical register of the register file circuitry 80 is provided with a further set of tag storing portions $134_0$ to $134_{31}$ in addition to the tag storing portions $34_0$ to $34_{31}$. The tags stored in the tag storing portions $34_0$ to $34_{31}$ are referred to as working tags, and the tags stored in the tag storing portions $134_0$ to $134_{31}$ are referred to as committed tags.

The circuitry 80 further comprises a first series of register stages (K-register stages) $82_0$ to $82_4$ and a second series of register stages (TCP-register stages) $84_0$ to $84_3$.

The K-register stages $82_0$ to $82_4$ are each used for storing a value of K. The K-value stored in the K-register stage $82_4$ is referred to as a committed K-value. The K-register stages $82_0$ to $82_3$ form part of a committed K updating unit 182. A multiplexer 86 is connected between an input of the K-register $82_0$ and an output of the K-register $82_4$.

The TCP-register stages $84_0$ to $84_3$ are each used for storing a set of tag change parameters (TCPs) used by the tag management units to change the working tags. The stored TCPs are derived, for example, from the ROTATION and (if used) the ROTATEBYTWO control signals. The TCP-register stages $84_0$ to $84_3$ form part of a committed tag updating unit 184.

In normal operation (no exception and no stall), when an instruction enters the first pipeline stage (stage 0) the TCPs applicable at that time are registered in the register stage $84_0$. Similarly the K-value applicable at that time is registered in the register stage $82_0$. As successive instructions enter the pipeline the TCPs and K progress through the register stages of the first and second series, with each set of TCPs and each K-value keeping up with its corresponding instruction in the execution-unit pipeline.

The committed tag updating unit 184 operates in each processor cycle to update the committed tags in accordance with the TCPs as held in register stage $84_3$. In this way, the committed tags correspond to the tags applicable to the instruction exiting the last pipeline stage (the last committed instruction), whilst the working tags correspond to the tags applicable to the instruction entering the first pipeline stage. Tags applicable to the instructions in intermediate pipeline stages are not stored, only the K-value and TCPs for the intermediate pipeline stages are stored.

As shown schematically in FIG. 19, each pipeline stage also has an exception flag and a stall flag. Exception and stalls need to be dealt with in different ways.

In the case of exception handling, there are some exceptional conditions which arise in the processor from which no recovery is possible, for example a program error arising from an attempt to decode an invalid opcode, and other exceptional conditions from which recovery is possible after the cause of the exceptional condition has been removed, for example a virtual memory translation error. Such an exceptional condition may arise in any pipeline stage. The pipeline stage i in which the exception occurs (the "excepting pipeline stage") sets its exception flag when the exceptional condition is detected. Instructions in subsequent stages i+1 onwards must complete, whereas instructions in the excepting stage i and all preceding stages must be effectively discarded.

Accordingly, when an exception occurs in pipeline stage i, TCP-register stages $84_i$ for the excepting pipeline stage i and all preceding register stages $84_0$ to $84_{i-1}$ reset their TCPs to 0 (no renaming operation required). The K-values in the K-register stages $82_0$ to $82_{i-1}$ are not changed but are noted as invalid. In each processor cycle whilst the exception is handled all TCP- and K-register stages continue to drive forward. The K- and TCP-register stages following the excepting pipeline stage i continue normal operation to ensure that K and the TCPs progress through to the register stages $82_3$ and $84_3$. The TCPs for stages 0 to i−1 do not affect the committed tags when they reach stage $84_3$ because they have been reset to 0. Similarly, the committed K updating unit 182 only updates the committed K-value in register stage $82_4$ when the preceding stage $82_3$ has a valid K-value and there is no pending exception or stall. Thus, even though the K-values for stages 0 to i−1 will reach stage $82_3$ the committed K-value is not updated because those K-values were noted as invalid when the exception occurred. In this way, it is ensured that the content of the register stages $82_4$ and $84_3$ corresponds to the last committed instruction state.

Once the last valid instruction prior to the occurrence of the exception has reached the commit stage (i.e. the last pipeline stage), the committed tags, as held in the tag storing portions $134_0$ to $134_{31}$, are reloaded into the tag storing portions $34_0$ to $34_{31}$. Similarly, the committed K-value, as held in the register $82_4$, is reloaded into the register $82_0$ via the multiplexer 86.

In the case of stall control, processors attempt to keep the pipeline full at all times, thus ensuring a high rate of instruction completion. However, it is possible that an instruction may not be able to progress through one of the pipeline stages in a single clock cycle for some reason (perhaps because it needs to access slow memory or compute a multi-cycle operation). Such an event is referred to as a stall. When stage i stalls it prevents the instruction at stage i−1 from making forward progress, even if the instruction at stage i−1 is not itself stalled. This in turn stalls stage i−2, and so on back to stage 0.

In the FIG. 19 embodiment, in the event of a stall in stage i, the K-register stages $82_0$ to $82_i$ and the TCP-register stages $84_0$ to $84_i$ for the stalling pipeline stage and all preceding register stages recirculate their existing values for the duration of the stall. The TCPs applied to the input of stage 0 are reset to zero (no renaming operation required) by the committed tag updating unit 184 as long as the stall persists. The remaining register stages $82_{i+1}$ to $82_3$ and $84_{i+1}$ to $84_3$ continue pipelined operation, although the TCP-registers $84_{i+1}$ to $84_3$ receive "dummy" TCPs (reset to zero) from the stalled preceding stages to prevent the TCPs for the stalled pipeline stages from affecting the committed tags until the stalled instructions proceed, after the stall is over, to exit the pipeline.

Figure 20:
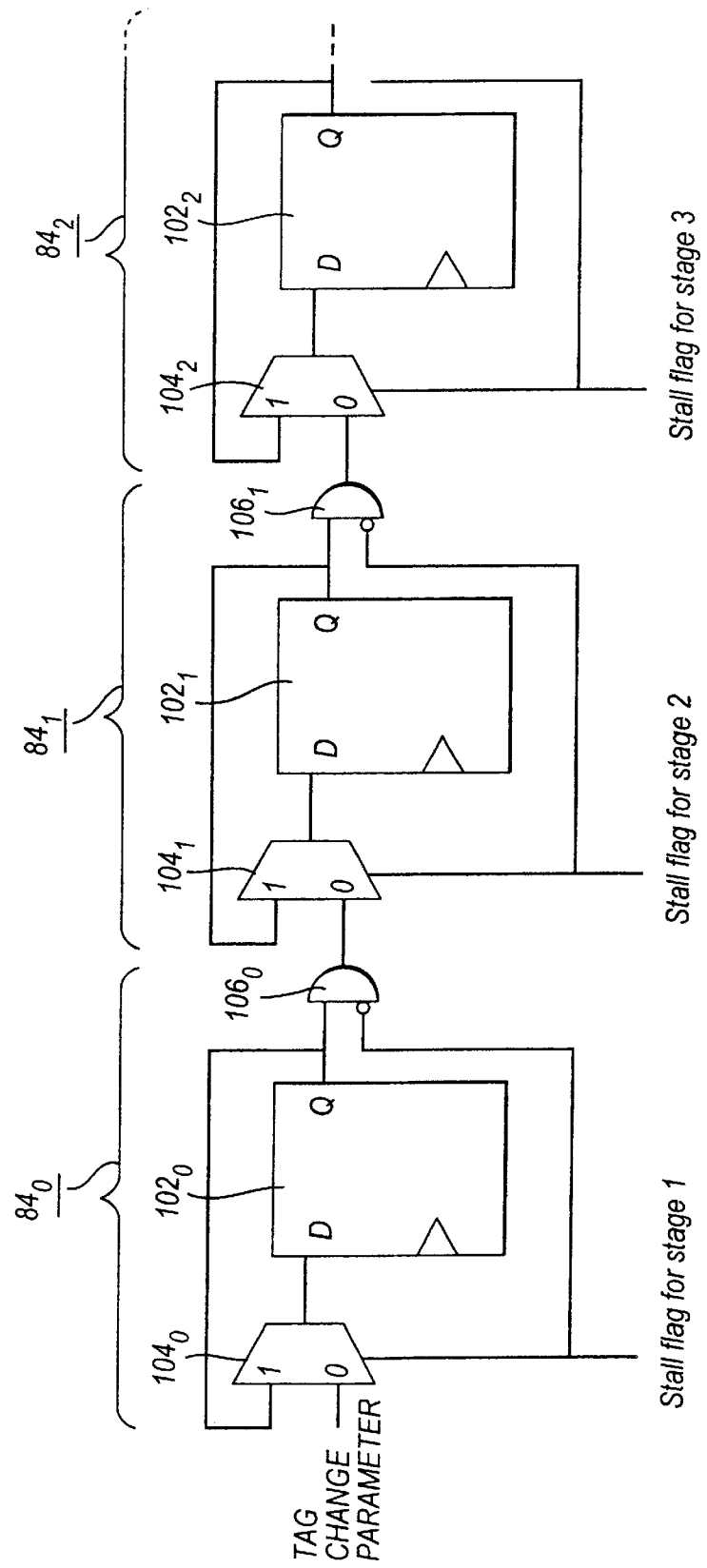
FIG. 20 shows, in more detail than FIG. 19, parts of the FIG. 19 circuitry.

FIG. 20 shows parts of the TCP-register stages in more detail. FIG. 20 only shows parts of the circuitry in the stages $84_0$, $84_1$, and $84_2$ and only shows the parts of the circuitry for dealing with one of the TCPs. The same or similar circuitry is provided for each of the other TCPs.

As shown in FIG. 20, each register stage comprises a register element 102 and stall control circuitry made up of a multiplexer 104 and a logic gate 106. The multiplexer 104 has a selection input to which the stall flag for the pipeline stage concerned is applied. The stall flag is set to 1 when a stall occurs in the stage and is set to 0 otherwise. The multiplexer 104 also has first and second data inputs. The first data input ("0") is selected when the stall flag is inactive (0). The second input ("1") is selected when the stall flag is active (1). The second input of the multiplexer 104 is fed back from a data output Q of the register element 102 in the register stage concerned. Accordingly, when the stall flag for the stage is inactive the TCP from the preceding register stage is registered in the register element 102 of the stage at the next working clock edge. When the stall flag is active, however, the current state of the TCP held in the register element 102 of the stage is recirculated via the multiplexer 104 back from the output of the register element 102 to the input thereof, with the result that the current state is maintained.

The logic gate 106 in each stage receives the stall flag and the current state of the register element 102 in the stage. Whenever the stall flag is active the output of the logic gate 106 is inactive (0).

It follows that when a stall flag is set in pipeline stage i the register element $102_{i-1}$ in the register stage i–1 presents an inactive tag change parameter to the input of the next register stage i. This ensures that for the duration of the stall the committed tags (as stored in the tag storing portions $134_0$ to $134_{31}$) will change (rotate) as required for the instructions in the non-stalled pipelined stages i+1 onwards but will then stop changing regardless of the states of the TCPs stored in the register elements for the stalled stages 0 to i.

The TCP-register stages for dealing with the TCP corresponding to the RESET signal need not include the logic gates 106, i.e. the Q output of each register element $102_i$ is connected directly to the "0" input of the multiplexer $104_{i+1}$. The output of the final TCP-register stage for the RESET signal is only used to update (reset) the committed tags, however, if the K-values in all the register stages $82_0$ to $82_3$ are valid and there is no pending exception or stall.

As described above, embodiments of the present invention can provide register file circuitry which has a fully-programmable boundary between its static and renameable regions whilst minimising the timing overhead for selecting and accessing the desired physical register. Frequently, the critical path through a processor register file is one of the critical paths for the processor as a whole and therefore reducing the path delay in the register file can enable a higher clock frequency to be used for the processor as a whole.

Although the above description relates, by way of example, to a VLIW processor capable of software-pipeline execution, it will be appreciated that the present invention is applicable to processors not having these features. A processor embodying the present invention may be included as a processor "core" in a highly-integrated "system-on-a-chip" (SOC) for use in multimedia applications, network routes, video mobile phones, intelligent automobiles, digital' television, voice recognition, 3D games, etc.

What we claim is:

1. Register file circuitry comprising:
   a plurality of physical registers;
   a plurality of tag storing portions, corresponding respectively to the physical registers, each for storing a tag representing a logical register ID allocated to the corresponding physical register;
   a register selection unit which receives a logical register ID and selects that one of the physical registers whose said tag matches the received logical register ID; and
   a tag changing unit which changes the stored tags by transferring the tag stored in at least one tag storing portion into another one of said tag storing portions, thereby to change a mapping between at least one logical register ID and one of said physical registers.

2. Circuitry as claimed in claim 1, wherein said tag changing unit is operable to rotate the stored tags cyclically through the tag storing portions corresponding respectively to some or all of the plurality of physical registers.

3. Circuitry as claimed in claim 1, further comprising:
   a physical register designating unit which designates at least one physical register of said plurality as a statically-named physical register whose said tag is not changeable by said tag changing unit.

4. Circuitry as claimed in claim 3, wherein said physical register designating unit divides the physical registers of said plurality into at least a statically named region and a dynamically-named region, each said region having one or more physical registers, and said tag changing unit is permitted to change the stored tag of each physical register in said dynamically-named region but is inhibited from changing the stored tag of each physical register in said statically-named region.

5. Circuitry as claimed in claim 4, wherein a boundary between said statically-named region and said dynamically-named region is programmable.

6. Circuitry as claimed in claim 1, wherein:
   the tag storing portion corresponding to each physical register has a predetermined source tag storing portion from among the plurality of tag storing portions; and
   said tag changing unit is operable, for each said tag storing portion, to transfer into the tag storing portion concerned the tag stored in that predetermined source tag storing portion.

7. Circuitry as claimed in claim 6, wherein, for the tag storing portion corresponding to each physical register, the source tag storing portion is the tag storing portion corresponding to an adjacent one of the physical registers.

8. Circuitry as claimed in claim 1, wherein:
   the tag storing portion corresponding to each physical register has two or more predetermined source tag storing portions from among the plurality of tag storing portions; and
   said tag changing unit is operable, for each said tag storing portion, to select one of said two or more predetermined source tag storing portions and to transfer into the tag storing portion concerned the tag stored in the selected one of the source tag storing portions.

9. Circuitry as claimed in claim 8, wherein, for the tag storing portion corresponding to each physical register, one said source tag storing portion is the tag storing portion corresponding to an adjacent one of the physical registers.

10. Circuitry as claimed in claim 8, wherein, for the tag storing portion corresponding to each physical register, one said source tag storing portion is the tag storing portion corresponding to an end one of the physical registers.

11. Circuitry as claimed in claim 8, wherein, for the tag storing portion corresponding to each physical register, one said source tag storing portion is the tag storing portion corresponding to a next-but-one of the physical registers.

12. Circuitry as claimed in claim 8, wherein, for the tag storing portion corresponding to each physical register, one said source tag storing portion is the tag storing portion corresponding to an end-but-one of said physical registers.

13. Circuitry as claimed in claim 1, further comprising:
a reset unit which sets the tag for each physical register to a preselected initial logical register ID allocated to the physical register concerned.

14. Circuitry as claimed in claim 1, comprising:
a plurality of tag management units, corresponding respectively to the physical registers, each tag management unit including said tag storing portion corresponding to the unit's corresponding physical register, and each tag management unit being operable to change the tag stored in said tag storing portion of its own unit;
two or more of said tag management units being operable in parallel with one another to bring about said change in said mapping.

15. Circuitry as claimed in claim 14, wherein each tag management unit comprises a multiplexer having a plurality of inputs, each for receiving a different candidate tag value, and also having an output connected to said tag storing portion in the unit, and operable in dependence upon one or more control signals applied to the tag management unit to deliver a selected one of the different candidate tag values to said tag storing portion for storage thereby.

16. Circuitry as claimed in claim 15, further comprising:
a physical register designating unit which designates at least one physical register of said plurality as a statically-named physical register whose said tag is not changeable by said tag changing unit, wherein the or one such control signal indicates whether or not the physical register corresponding to that tag management unit is such a statically-named register.

17. Circuitry as claimed in claim 15, wherein:
the tag storing portion corresponding to each physical register has two or more predetermined source tag storing portions from among the plurality of tag storing portions;
said tag changing unit is operable, for each said tag storing portion, to select, in dependence upon at least one of said control signals, one of said two or more predetermined source tag storing portions and to transfer into the tag storing portion concerned the tag stored in the selected one of the source tag storing portions.

18. Circuitry as claimed in claim 1, wherein said register selection unit comprises a plurality of comparator elements corresponding respectively to the physical registers, each comparator element being operable to produce a selection signal when the stored tag for its corresponding physical register matches said received logical register ID.

19. Circuitry as claimed in claim 18, further comprising:
a plurality of output units, each corresponding to a different bit of the physical registers, and each connected to said plurality of comparator elements for receiving therefrom said selection signal produced by each comparator element, and each output unit being responsive to said selection signal produced by one of said comparator elements to read out its said corresponding bit of a data word stored in said physical register corresponding to that one comparator element.

20. Circuitry as claimed in claim 19, wherein said register selection unit and said plurality of output units belong to a first read port of the circuitry, and the circuitry further comprises at least one further read port comprising a further such register selection unit and a further such plurality of output units.

21. Circuitry as claimed in claim 1, for use in a processor having a series of pipeline stages for executing instructions, wherein said plurality of tag storing portions constitute a first plurality of tag storing portions provided at a first one of the pipeline stages of the series for storing respective working tags, the circuitry further comprising:
a second plurality of tag storing portions, corresponding respectively to the physical registers, for storing respective committed tags corresponding respectively to the working tags;
a committed tag updating unit connected to said second plurality of tag storing portions for updating the committed tags as instructions progress through the pipeline stages; and
a working tag reloading unit connected to said first and second pluralities of tag storing portions and operable, when a last valid instruction prior to occurrence of an exception has reached a last one of the pipeline stages, to reload each working tag with its corresponding committed tag.

22. Circuitry as claimed in claim 21, wherein said committed tag updating unit comprises a series of register stages, each pipeline stage other than said last pipeline stage having a corresponding one of the register stages of said series, a first one of said register stages being connected for receiving and registering at least one tag change parameter, representing a tag change applied when an instruction enters the pipeline, and each said register stage other than said first register stage being connected to the immediately-preceding stage for receiving therefrom and registering said at least one tag change parameter.

23. Circuitry as claimed in claim 22, wherein said committed tag updating unit is operable, when an exception occurs in pipeline stage i, to update the committed tags in accordance with the tag change parameters held in register stage i+1 and any subsequent register stage and to prevent the committed tags from being updated by the tag change parameters held in register stages 0 to i.

24. Circuitry as claimed in claim 22, wherein said committed tag updating unit is operable, when a stall occurs in pipeline stage i, to update the committed tags during the stall in accordance with the tag change parameters held in the register stage i+1 and any subsequent register stage and to preserve the tag change parameters held in the register stages 0 to i pending release of the stall, so that those preserved tag change parameters are available for updating the committed tags when the stall is released.

25. Register file circuitry comprising:
a plurality of physical registers;
a plurality of tag storing portions, corresponding respectively to the physical registers, each for storing a tag representing a logical register ID allocated to the corresponding physical register;
a register selection unit which receives a logical register ID and selects that one of the physical registers whose said tag matches the received logical register ID;
a tag changing unit which changes the stored tags so as to change a mapping between at least one logical register ID and one of said physical registers; and
a physical register designating unit which designates at least one physical register of said plurality as a statically-named physical register whose said tag is not changeable by said tag changing unit.

26. Register file circuitry comprising:

a plurality of physical registers;

a plurality of tag management units, corresponding respectively to the physical registers, each tag management unit including a tag storing portion for storing a tag representing a logical register ID allocated to the unit's corresponding physical register, and each tag management unit being operable to change the tag stored in said tag storing portion of its own unit;

a register selection unit which receives a logical register ID and selects that one of the physical registers whose said tag matches the received logical register ID;

two or more of said tag management units being operable in parallel with one another to bring about a change in mapping between at least one logical register ID and one of said physical registers.

27. Register file circuitry for use in a processor having a series of pipeline stages for executing instructions, said circuitry comprising:

a plurality of physical registers;

a first plurality of tag storing portions, corresponding respectively to the physical registers and provided at a first one of the pipeline stages of the series, each for storing a working tag representing a logical register ID allocated to the corresponding physical register;

a second plurality of tag storing portions, corresponding respectively to the physical registers, for storing respective committed tags corresponding respectively to the working tags;

a committed tag updating unit connected to said second plurality of tag storing portions for updating the committed tags as instructions progress through the pipeline stages; and a working tag reloading unit connected to said first and second pluralities of tag storing portions and operable, when a last valid instruction prior to occurrence of an exception has reached a last one of the pipeline stages, to reload each working tag with its corresponding committed tag.

28. Register file circuitry comprising:

a plurality of physical registers;

a plurality of tag storing portions, corresponding respectively to the physical registers, each for storing a tag representing a logical register ID allocated to the corresponding physical register;

register selection means for receiving a logical register ID and selecting that one of the physical registers whose said tag matches the received logical register ID; and tag changing means operable to change the stored tags by transferring the tag stored in at least one tag storing portion into another one of said tag storing portions, thereby to change a mapping between at least one logical register ID and one of said physical registers.

29. Register file circuitry comprising:

a plurality of tag storing portions, corresponding respectively to the physical registers, each for storing a tag representing a logical register ID allocated to the corresponding physical register;

register selection means for receiving a logical register ID and selecting that one of the physical registers whose said tag matches the received logical register ID;

tag changing means for changing the stored tags so as to change a mapping between at least one logical register ID and one of said physical registers; and physical register designating means for designating at least one physical register of said plurality as a statically-named physical register whose said tag is not changeable by said tag changing means.

30. Register file circuitry comprising:

a plurality of physical registers;

a plurality of tag management units, corresponding respectively to the physical registers, each tag management unit including a tag storing portion for storing a tag representing a logical register ID allocated to the unit's corresponding physical register, and each tag management unit being operable to change the tag stored in said tag storing portion of its own unit;

register selection means for receiving a logical register ID and selecting that one of the physical registers who said tag matches the received logical register ID;

two or more of said tag management units being operable in parallel with one another to bring about a change in mapping between at least one logical register ID and one of said physical registers.

31. Register file circuitry for use in a processor having a series of pipeline stages for executing instructions, said circuitry comprising:

a plurality of physical registers;

a first plurality of tag storing portions, corresponding respectively to the physical registers and provided at a first one of the pipeline stages of the series, each for storing a working tag representing a logical register ID allocated to the corresponding physical register;

a second plurality of tag storing portions, corresponding respectively to the physical registers, for storing respective committed tags corresponding respectively to the working tags;

committed tag updating means connected to said second plurality of tag storing portions for updating the committed tags as instructions progress through the pipeline stages; and working tag reloading means connected to said first and second pluralities of tag storing portions and operable, when a last valid instruction prior to occurrence of an exception has reached a last one of the pipeline stages, to reload each working tag with its corresponding committed tag.

32. A processor comprising:

a plurality of physical registers;

a plurality of tag storing portions, corresponding respectively to the physical registers, each for storing a tag representing a logical register ID allocated to the corresponding physical register;

a register selection unit which receives a logical register ID and selects that one of the physical registers whose said tag matches the received logical register ID; and a tag changing unit which changes the stored tags by transferring the tag stored in at least one tag storing portion into another one of said tag storing portions, thereby to change a mapping between at least one logical register ID and one of said physical registers.

33. A processor comprising:

a plurality of physical registers;

a plurality of tag storing portions, corresponding respectively to the physical registers, each for storing a tag representing a logical register ID allocated to the corresponding physical register;

a register selection unit which receives a logical register ID and selects that one of the physical registers whose said tag matches the received logical register ID;

a tag changing unit which changes the stored tags so as to change a mapping between at least one logical register ID and one of said physical registers; and a physical register designating unit which designates at least one physical register of said plurality as a statically-named physical register whose said tag is not changeable by said tag changing unit.

34. A processor comprising:

a plurality of physical registers;

a plurality of tag management units, corresponding respectively to the physical registers, each tag management unit including a tag storing portion for storing a tag representing a logical register ID allocated to the unit's corresponding physical register, and each tag management unit being operable to change the tag stored in said tag storing portion of its own unit;

a register selection unit which receives a logical register ID and selects that one of the physical registers whose said tag matches the received logical register ID;

two or more of said tag management units being operable in parallel with one another to bring about a change in mapping between at least one logical register ID and one of said physical registers.

35. A processor comprising:

a series of pipeline stages for executing instructions;

a plurality of physical registers;

a first plurality of tag storing portions, corresponding respectively to the physical registers and provided at a first one of the pipeline stages of the series, each for storing a working tag representing a logical register ID allocated to the corresponding physical register;

a second plurality of tag storing portions, corresponding respectively to the physical registers, for storing respective committed tags corresponding respectively to the working tags;

a committed tag updating unit connected to said second plurality of tag storing portions for updating the committed tags as instructions progress through the pipeline stages; and a working tag reloading unit connected to said first and second pluralities of tag storing portions and operable, when a last valid instruction prior to occurrence of an exception has reached a last one of the pipeline stages, to reload each working tag with its corresponding committed tag.

36. A register renaming method for use in register file circuitry having a plurality of physical registers, said method comprising:

storing tags in a plurality of tag storing portions corresponding respectively to the physical registers, each stored tag representing a logical register ID allocated to the corresponding physical register; and changing the stored tags by transferring the tag stored in at least one tag storing portion into another one of said tag storing portions so as to change a mapping between at least one logical register ID and one of said physical registers.

37. A method as claimed in claim 36, comprising rotating the stored tags cyclically through the tag storing portions corresponding respectively to some or all of the plurality of physical registers.

* * * * *